United States Patent
Yan et al.

(10) Patent No.: US 12,238,511 B2
(45) Date of Patent: Feb. 25, 2025

(54) COMMUNICATION METHOD AND APPARATUS, AND COMPUTER-READABLE STORAGE MEDIUM

(71) Applicant: HUAWEI TECHNOLOGIES CO., LTD., Shenzhen (CN)

(72) Inventors: Le Yan, Shenzhen (CN); Qinghai Zeng, Shanghai (CN); Hongping Zhang, Shenzhen (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 17/684,711

(22) Filed: Mar. 2, 2022

(65) Prior Publication Data
US 2022/0201559 A1    Jun. 23, 2022

Related U.S. Application Data

(63) Continuation of application No. PCT/CN2020/112778, filed on Sep. 1, 2020.

(30) Foreign Application Priority Data

Sep. 4, 2019 (CN) .......................... 201910830355.6

(51) Int. Cl.
*H04L 12/28* (2006.01)
*H04W 36/00* (2009.01)

(52) U.S. Cl.
CPC .... *H04W 36/0064* (2023.05); *H04W 36/0069* (2018.08)

(58) Field of Classification Search
CPC ......... H04W 36/0055; H04W 36/0011; H04W 36/08
(Continued)

(56) References Cited

U.S. PATENT DOCUMENTS

2019/0159086 A1    5/2019  Xu et al.
2023/0268982 A1*   8/2023  Li ..................... H04B 7/15507
                                              370/315

FOREIGN PATENT DOCUMENTS

| CN | 103188663 A | 7/2013 |
| CN | 103959829 A | 7/2014 |
| CN | 105706473 A | 6/2016 |
| CN | 108924894 A | 11/2018 |
| CN | 109429281 A | 3/2019 |
| CN | 109691155 A | 4/2019 |
| EP | 3057349 A1 | 8/2016 |

(Continued)

OTHER PUBLICATIONS

Extended European Search Report issued in corresponding European Application No. 20861780.3, dated Sep. 27, 2022, pp. 1-6.
(Continued)

*Primary Examiner* — Dang T Ton
(74) *Attorney, Agent, or Firm* — HAUPTMAN HAM, LLP

(57) ABSTRACT

A communication method includes receiving, by a terminal device comprising a processor, indication information from a master node. The indication information is used to indicate that a key used for signaling transmission performed between the terminal device and a first secondary node by using a second signaling radio bearer (SRB) is a first key. The first key is used for signaling transmission performed between the terminal device and the master node by using a first SRB. The first secondary node and the master node share one central unit. The communication method also includes determining, by the terminal device, based on the indication information, that the first key is used for signaling transmission performed between the terminal device and the first secondary node by using the second SRB.

20 Claims, 11 Drawing Sheets

(58) Field of Classification Search
USPC .................................. 370/329, 401, 402, 403
See application file for complete search history.

(56) References Cited

FOREIGN PATENT DOCUMENTS

| EP | 3282760 | A1 | | 2/2018 | |
|----|---------|-----|---|--------|---|
| EP | 3522604 | A1 | | 8/2019 | |
| WO | WO-9967765 | A1 | * | 12/1999 | ......... G01C 21/3697 |
| WO | 2015097980 | A1 | | 7/2015 | |

OTHER PUBLICATIONS

Ericsson, Security key update during handover. 3GPP TSG-RAN WG2 #101Bis, Sanya, P.R. of China, Apr. 16-20, 2018, R2-1804798, 9 pages.

3GPP TS 33.501 V15.5.0 (Jun. 2019), 3rd Generation Partnership Project; Technical Specification Group Services and System Aspects; Security architecture and procedures for 5G system(Release 15), 190 pages.

3GPP TS 37.340 V15.6.0 (Jun. 2019), 3rd Generation Partnership Project; Technical Specification Group Radio Access Network; Evolved Universal Terrestrial Radio Access (E-UTRA) and NR; Multi-connectivity; Stage 2(Release 15), 69 pages.

3GPP TS 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15), 960 pages.

International Search Report issued in corresponding International Application No. PCT/CN2020/112778, dated Dec. 4, 2020, pp. 1-11.

Chinese Office Action issued in corresponding Chinese Application No. 201910830355.6, dated Jul. 1, 2021, pp. 1-10.

* cited by examiner

COMMUNICATION METHOD AND APPARATUS, AND COMPUTER-READABLE STORAGE MEDIUM

CROSS-REFERENCE TO RELATED APPLICATIONS

This application is a continuation of International Application No. PCT/CN2020/112778, filed on Sep. 1, 2020, which claims priority to Chinese Patent Application No. 201910830355.6, filed on Sep. 4, 2019. The disclosures of the aforementioned applications are hereby incorporated by reference in their entireties.

TECHNICAL FIELD

This application relates to the communication field, and more specifically, to a communication method and apparatus, and a computer-readable storage medium.

BACKGROUND

A terminal device may simultaneously communicate with a plurality of network devices by using a dual connectivity (dual connectivity, DC) technology. In other words, in the DC technology, different network devices can simultaneously provide data transmission services for one terminal device. One network device may be referred to as a master node MN, and another network device is referred to as a secondary node SN.

When signaling transmission is performed between the terminal device and the master node (master node, MN) and the secondary node (secondary node, SN), the terminal device needs to determine a key between the terminal device and the secondary node SN. In a conventional technical solution, the terminal device may determine, based on a key used between the terminal device and the master node MN, the key used between the terminal device and the secondary node SN, and perform signaling transmission with the secondary node SN based on the determined key.

In a 5G system, one CU may be connected to one DU, or a plurality of DUs may share one CU, to reduce costs and facilitate network expansion. The CU and the DU may be considered as one network device. In a scenario in which the master node and the secondary node share one central unit CU, the key used between the terminal device and the secondary node SN is derived by using a conventional technical solution, implementation complexity is increased.

SUMMARY

This application provides a communication method and apparatus, and a computer-readable storage medium. In a scenario in which a master node and a secondary node share one CU, a terminal device may determine that a key for signaling transmission performed between the terminal device and the secondary node is the same as a key for signaling transmission performed between the terminal device and the master node. This avoids complexity caused by deriving the key for signaling transmission performed between the terminal device and the secondary node.

According to a first aspect, a communication method is provided. The method may be performed by a terminal device or a chip used in the terminal device, and includes: The terminal device receives indication information from a master node, where the indication information is used to indicate that a key used for signaling transmission performed between a terminal device and a first secondary node by using a second signaling radio bearer SRB is a first key, the first key is a key used for signaling transmission performed between the terminal device and the master node by using a first SRB, and the first secondary node and the master node share one central unit CU. The terminal device determines, based on the indication information, that the key used for signaling transmission performed between the terminal device and the first secondary node by using the second SRB is the first key.

It should be understood that the master node and/or a secondary node in this application may include a central unit (centralized unit, CU) and a distributed unit (distributed unit, DU).

In the foregoing technical solution, in a scenario in which the master node MN and the secondary node SN share one CU, the terminal device may determine that a key for signaling transmission performed between the terminal device and the secondary node SN by using the second SRB is the same as the key for signaling transmission performed between the terminal device and the master node MN by using the first SRB. Therefore, when signaling transmission is performed between the terminal device and the secondary node SN by using the second SRB, the terminal device may use the key used for signaling transmission performed between the terminal device and the MN, and does not need to derive, based on the key corresponding to the MN, the key used for signaling transmission performed between the terminal device and the secondary node SN by using the second SRB. Therefore, implementation complexity is reduced and resources are saved.

With reference to the first aspect, in some possible implementations of the first aspect, the indication information is carried in a radio resource control RRC reconfiguration message, and the RRC reconfiguration message is used to indicate the terminal device to add the first secondary node, or used to indicate the terminal device to be handed over from a second secondary node to the first secondary node.

With reference to the first aspect, in some possible implementations of the first aspect, the first SRB is SRB1 or SRB2, and the second SRB is SRB3.

In this application, the first SRB is a bearer for signaling transmission performed between the terminal device and the master node, and the second SRB is a bearer for signaling transmission performed between the terminal device and the secondary node.

The first SRB may be SRB1 or SRB2. After security activation is performed at an access stratum (access stratum, AS), a network may configure SRB2, where SRB2 is used to send a non-access stratum (non-access stratum, NAS) message on a dedicated control channel (dedicated control channel, DCCH). SRB1 is used to send a radio resource control (radio resource control, RRC) message, or is used to send a NAS message on a DCCH before SRB2 is established. It should be noted that the RRC message may include the NAS message. A priority of SRB2 is lower than that of SRB1.

Specifically, the RRC reconfiguration message used to indicate to add the secondary node may include a secondary cell group configuration (secondary cell group configuration) information element. In an NR system, an RRC reconfiguration message used to indicate handover may carry a reconfiguration with sync (reconfiguration with sync) information element. In an LTE system, the RRC reconfiguration message used to indicate handover may carry a mobility control information (mobility control info) information element.

With reference to the first aspect, in some possible implementations of the first aspect, the RRC reconfiguration message further includes a first value. When the first value is a preset value, the terminal device determines, based on the first value, that the key used for signaling transmission performed between the terminal device and the first secondary node by using the second SRB is the first key.

With reference to the first aspect, in some possible implementations of the first aspect, the first value is an sk-counter value.

According to a second aspect, a communication method is provided. The method may be performed by a master node or a component used in the master node, and includes: sending indication information to a terminal device, where the indication information is used to indicate that a key used for signaling transmission performed between a terminal device and a first secondary node by using a second signaling radio bearer SRB is a first key, the first key is a key used for signaling transmission performed between the terminal device and the master node by using a first SRB, and the first secondary node and the master node share one central unit CU. The component used in the master node includes a CU, a chip used in the CU, a DU, a chip used in the DU, or a chip used in the master node.

With reference to the second aspect, in some possible implementations of the second aspect, the indication information is carried in a radio resource control RRC reconfiguration message, and the RRC reconfiguration message is used to indicate the terminal device to add the first secondary node, or used to indicate the terminal device to be handed over from a second secondary node to the first secondary node.

With reference to the second aspect, in some possible implementations of the second aspect, the first SRB is SRB1 or SRB2, and the second SRB is SRB3.

With reference to the second aspect, in some possible implementations of the second aspect, the RRC reconfiguration message further includes a first value. When the first value is a preset value, the first value is used to indicate that the key used for signaling transmission performed between the terminal device and the first secondary node by using the second SRB is the first key.

With reference to the second aspect, in some possible implementations of the second aspect, the first value is an sk-counter value.

According to a third aspect, a communication method is provided. The method may be performed by a terminal device or a chip used in the terminal device, and includes: The terminal device receives a radio resource control RRC reconfiguration message from a source network device, where the RRC reconfiguration message is used to indicate the terminal device to add, as a secondary node SN, a network device to which a target cell to which handover needs to be performed belongs. The terminal device determines a second key based on the RRC reconfiguration message by using one or more of the following information: a first key used for transmission between the terminal device and the source network device, information about the target cell, and a next-hop NH corresponding to a next hop chaining counter NCC, where the second key is a key used for transmission between the terminal device and the target network device, the information about the target cell includes frequency information of the target cell and/or a physical cell identifier of the target cell, the target cell belongs to the target network device, the source network device is a master node MN before handover and is a secondary node SN after handover, and the target network device is a secondary node SN before handover and is a master node MN after handover.

With reference to the third aspect, in some possible implementations of the third aspect, the RRC reconfiguration message includes a first NCC.

With reference to the third aspect, in some possible implementations of the third aspect, the terminal device determines the second key based on an NH corresponding to the first NCC and the information about the target cell, where a second NCC is a value last used by the terminal device before the terminal device receives the RRC reconfiguration message, and the first NCC is different from the second NCC.

With reference to the third aspect, in some possible implementations of the third aspect, the method further includes: The terminal device determines that the first NCC is different from the second NCC. The terminal device determines the second key based on distinctness between the first NCC and the second NCC by using the NH corresponding to the first NCC and the information about the target cell.

With reference to the third aspect, in some possible implementations of the third aspect, the terminal device determines the second key based on the first key and the information about the target cell, where the first NCC is the same as a second NCC.

With reference to the third aspect, in some possible implementations of the third aspect, the method further includes: The terminal device determines that the first NCC is the same as the second NCC. The terminal device determines the second key based on sameness between the first NCC and the second NCC by using the first key and the information about the target cell.

With reference to the third aspect, in some possible implementations of the third aspect, the RRC reconfiguration message includes first indication information, and the first indication information is used to indicate that the first NCC is different from the second NCC. The terminal device determines the second key based on the first indication information by using the NH corresponding to the first NCC and the information about the target cell.

With reference to the third aspect, in some possible implementations of the third aspect, the RRC reconfiguration message includes second indication information, and the second indication information is used to indicate the terminal device to determine the second key by using the first key and the information about the target cell.

The terminal device determines the second key based on the second indication information by using the first key and the information about the target cell.

Optionally, the second indication information may indicate that the first NCC is the same as the second NCC, to indicate the terminal device to determine the second key by using the first key and the information about the target cell. Alternatively, the second indication information indicates that the RRC reconfiguration message does not include the first NCC, to implicitly indicate that the first NCC is the same as the second NCC, and/or indicate the terminal device to determine the second key by using the first key and the information about the target cell.

With reference to the third aspect, in some possible implementations of the third aspect, the RRC reconfiguration message includes a first value.

With reference to the third aspect, in some possible implementations of the third aspect, the RRC reconfiguration message further includes a first value and a first NCC.

The terminal device determines the second key based on the first value and the first key, where the first NCC is the same as a second NCC.

With reference to the third aspect, in some possible implementations of the third aspect, the method further includes: The terminal device determines that the first NCC is the same as the second NCC. The terminal device determines, by using the first value and the first key, the second key based on sameness between the first NCC and the second NCC and the first value that is included in the RRC reconfiguration message.

With reference to the third aspect, in some possible implementations of the third aspect, the RRC reconfiguration message further includes a first value and third indication information, and the third indication information is used to indicate to determine the second key based on the first value and the first key.

The terminal device determines, by using the first value and the first key, the second key based on the third indication information and the first value that is included in the RRC reconfiguration message.

Optionally, the third indication information may indicate, by indicating that the first NCC is the same as the second NCC, that the second key is determined based on the first value and the first key. Alternatively, the third indication information indicates that the RRC reconfiguration message does not include the first NCC, to implicitly indicate that the first NCC is the same as the second NCC, and/or indicate to determine the second key based on the first value and the first key.

With reference to the third aspect, in some possible implementations of the third aspect, the source network device may send two radio resource control RRC reconfiguration messages to the terminal device. An NR system is used as an example. In the NR system, one RRC reconfiguration message may carry a secondary cell group configuration information element. The RRC reconfiguration message is used to indicate the terminal device to perform a secondary node SN addition procedure (to be specific, indicate the terminal device to add, as the SN, the target network device to which handover needs to be performed). The other RRC reconfiguration message may carry a reconfiguration with sync information element, and the RRC reconfiguration message is used to indicate the terminal device to change the source network device (namely, the MN before handover) to the SN through handover, and change the target network device (namely, the SN before handover) to the MN through handover.

With reference to the third aspect, in some possible implementations of the third aspect, the source network device (namely, the MN before handover) may send only one RRC reconfiguration message to the terminal device. An NR system is used as an example, and the RRC reconfiguration message carries a secondary cell group configuration information element and a reconfiguration with sync information element. The terminal device may perform a secondary node SN addition procedure (to be specific, add, as the SN, the target network device to which handover needs to be performed) based on the secondary cell group configuration information element carried in the RRC reconfiguration message. In addition, the terminal device may perform a role exchange/handover procedure based on the reconfiguration with sync information element carried in the RRC reconfiguration message, so that the source network device (namely, the MN before handover) is changed to the SN through handover, and the target network device (namely, the SN before handover) is changed to the MN through handover.

With reference to the third aspect, in some possible implementations of the third aspect, the first value is an sk-counter value.

According to a fourth aspect, a communication method is provided. The method may be performed by a source network device or a component used in the source network device, and includes: sending a radio resource control RRC reconfiguration message to a terminal device, where the RRC reconfiguration message is used to indicate the terminal device to add, as a secondary node SN, a network device to which a target cell to which handover needs to be performed belongs, where the source network device is a master node MN before handover and is a secondary node SN after handover, and the target network device is a secondary node SN before handover and is a master node MN after handover. The component used in the source network device includes a CU, a chip used in the CU, a DU, a chip used in the DU, or a chip used in the source network device.

With reference to the fourth aspect, in some possible implementations of the fourth aspect, the method further includes: The source network device determines a second key by using one or more of the following information: a first key used for transmission between the terminal device and the source network device, information about the target cell, and a next-hop NH corresponding to a next hop chaining counter NCC, where the second key is a key used for transmission between the terminal device and the target network device, the information about the target cell includes frequency information of the target cell and/or a physical cell identifier of the target cell, the target cell belongs to the target network device, and the target network device is a network device to which the terminal device needs to be handed over. The source network device sends the second key to the target network device.

After determining the second key, the source network device may send the second key to the target network device. The source network device may further send related information about the second key to the terminal device. The related information may be, for example, indication information and/or a first NCC obtained by the source network device, may be a first value, may be a first value and indication information, or may be a first value and a first NCC.

With reference to the fourth aspect, in some possible implementations of the fourth aspect, the source network device determines the second key based on an NH corresponding to a first NCC and the information about the target cell, where a second NCC is a value last used by the terminal device before the terminal device sends the RRC reconfiguration message, and the first NCC is different from the second NCC.

With reference to the fourth aspect, in some possible implementations of the fourth aspect, the source network device determines the second key based on the first key and the information about the target cell, where a first NCC is the same as a second NCC.

With reference to the fourth aspect, in some possible implementations of the fourth aspect, the source network device determines the second key based on a first value and the first key, where a first NCC is the same as a second NCC.

With reference to the fourth aspect, in some possible implementations of the fourth aspect, the first value is an sk-counter value.

According to a fifth aspect, a communication apparatus is provided, and includes a module, a component, or a circuit configured to implement the method in the first aspect.

It may be understood that the communication apparatus in the fifth aspect may be a terminal device, or may be a component (for example, a chip or a circuit) that can be used in the terminal device.

According to a sixth aspect, a communication apparatus is provided, and includes a module, a component, or a circuit configured to implement the method in the second aspect.

It may be understood that the communication apparatus in the sixth aspect may be a master node, or may be a component (for example, a chip or a circuit) that can be used in the master node.

According to a seventh aspect, a communication apparatus is provided, and includes a module, a component, or a circuit configured to implement the method in the third aspect.

It may be understood that the communication apparatus in the seventh aspect may be the terminal device, or may be a component (for example, a chip or a circuit) that can be used in the terminal device.

According to an eighth aspect, a communication apparatus is provided, and includes a module, a component, or a circuit configured to implement the method in the fourth aspect.

It may be understood that the communication apparatus in the eighth aspect may be a source network device, or may be a component (for example, a chip or a circuit) that can be used in the source network device.

According to a ninth aspect, a communication apparatus is provided. The communication apparatus provided in this application has a function of implementing behavior of a terminal device in the foregoing method aspects, and includes corresponding means (means) configured to perform steps or functions described in the foregoing methods. The steps or functions may be implemented by using software, hardware (such as a circuit), or a combination of hardware and software. The communication apparatus may be a chip or the like.

In a possible design, the communication apparatus includes one or more processors. The one or more processors are configured to support the communication apparatus in performing corresponding functions of the terminal device in the foregoing methods.

Optionally, the communication apparatus may further include one or more memories. The memory is configured to be coupled to the processor, and stores program instructions and/or data that are/is necessary for the communication apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

Optionally, the communication apparatus may further include one or more communication units, and the communication unit may be a transceiver or a transceiver circuit. Optionally, the transceiver may alternatively be an input/output circuit or interface.

In another possible design, the communication apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the terminal device in any one of the first aspect or the possible implementations of the first aspect.

According to a tenth aspect, a communication apparatus is provided. The communication apparatus provided in this application has a function of implementing behavior of a master node in the foregoing method aspects, and includes corresponding means (means) configured to perform steps or functions described in the foregoing methods. The steps or functions may be implemented by using software, hardware (such as a circuit), or a combination of hardware and software. The communication apparatus may be a chip or the like.

In a possible design, the communication apparatus includes one or more processors. The one or more processors are configured to support the communication apparatus in performing corresponding functions of the master node in the foregoing methods.

Optionally, the communication apparatus may further include one or more memories. The memory is configured to be coupled to the processor, and stores program instructions and/or data that are/is necessary for the communication apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

Optionally, the communication apparatus may further include one or more communication units, and the communication unit may be a transceiver or a transceiver circuit. Optionally, the transceiver may alternatively be an input/output circuit or interface.

In another possible design, the communication apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the master node in any one of the second aspect or the possible implementations of the second aspect.

According to an eleventh aspect, a communication apparatus is provided. The communication apparatus provided in this application has a function of implementing behavior of a terminal device in the foregoing method aspects, and includes corresponding means (means) configured to perform steps or functions described in the foregoing methods. The steps or functions may be implemented by using software, hardware (such as a circuit), or a combination of hardware and software. The communication apparatus may be a chip or the like.

In a possible design, the communication apparatus includes one or more processors. The one or more processors are configured to support the communication apparatus in performing corresponding functions of the terminal device in the foregoing methods.

Optionally, the communication apparatus may further include one or more memories. The memory is configured to be coupled to the processor, and stores program instructions and/or data that are/is necessary for the communication apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

Optionally, the communication apparatus may further include one or more communication units, and the communication unit may be a transceiver or a transceiver circuit. Optionally, the transceiver may alternatively be an input/output circuit or interface.

In another possible design, the communication apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the terminal device in any one of the third aspect or the possible implementations of the third aspect.

According to a twelfth aspect, a communication apparatus is provided. The communication apparatus provided in this application has a function of implementing behavior of a source network device in the foregoing method aspects, and includes corresponding means (means) configured to perform steps or functions described in the foregoing methods. The steps or functions may be implemented by using software, hardware (such as a circuit), or a combination of hardware and software. The communication apparatus may be a chip or the like.

In a possible design, the communication apparatus includes one or more processors. The one or more processors are configured to support the communication apparatus in performing corresponding functions of the source network device in the foregoing methods.

Optionally, the communication apparatus may further include one or more memories. The memory is configured to be coupled to the processor, and stores program instructions and/or data that are/is necessary for the communication apparatus. The one or more memories may be integrated with the processor, or may be disposed independent of the processor. This is not limited in this application.

The memory may be an internal storage unit of the processor, may be an external storage unit independent of the processor, or may be a component including an internal storage unit of the processor and an external storage unit independent of the processor.

Optionally, the processor may be a general-purpose processor, and may be implemented by using hardware or software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, or may be located outside the processor and exist independently.

Optionally, the communication apparatus may further include one or more communication units, and the communication unit may be a transceiver or a transceiver circuit. Optionally, the transceiver may alternatively be an input/output circuit or interface.

In another possible design, the communication apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the source network device in any one of the fourth aspect or the possible implementations of the fourth aspect.

According to a thirteenth aspect, a computer-readable storage medium is provided, and includes a computer program. When the computer program is run on a communication apparatus, the communication apparatus is enabled to perform the method in any one of the first aspect or the implementations of the first aspect.

According to a fourteenth aspect, a computer-readable storage medium is provided, and includes a computer program. When the computer program is run on a communication apparatus, the communication apparatus is enabled to perform the method in any one of the second aspect or the implementations of the second aspect.

According to a fifteenth aspect, a computer-readable storage medium is provided, and includes a computer program. When the computer program is run on a communication apparatus, the communication apparatus is enabled to perform the method in any one of the third aspect or the implementations of the third aspect.

According to a sixteenth aspect, a computer-readable storage medium is provided, and includes a computer program. When the computer program is run on a communication apparatus, the communication apparatus is enabled to perform the method in any one of the fourth aspect or the implementations of the fourth aspect.

According to a seventeenth aspect, a computer program product is provided. When the computer program product runs on a computer, the computer is enabled to perform the method in any one of the first aspect or the implementations of the first aspect.

According to an eighteenth aspect, a computer program product is provided. When the computer program product runs on a computer, the computer is enabled to perform the method in any one of the second aspect or the implementations of the second aspect.

According to a nineteenth aspect, a computer program product is provided. When the computer program product runs on a computer, the computer is enabled to perform the method in any one of the third aspect or the implementations of the third aspect.

According to a twentieth aspect, a computer program product is provided. When the computer program product runs on a computer, the computer is enabled to perform the method in any one of the fourth aspect or the implementations of the fourth aspect.

DESCRIPTION OF EMBODIMENTS

Figure 1:
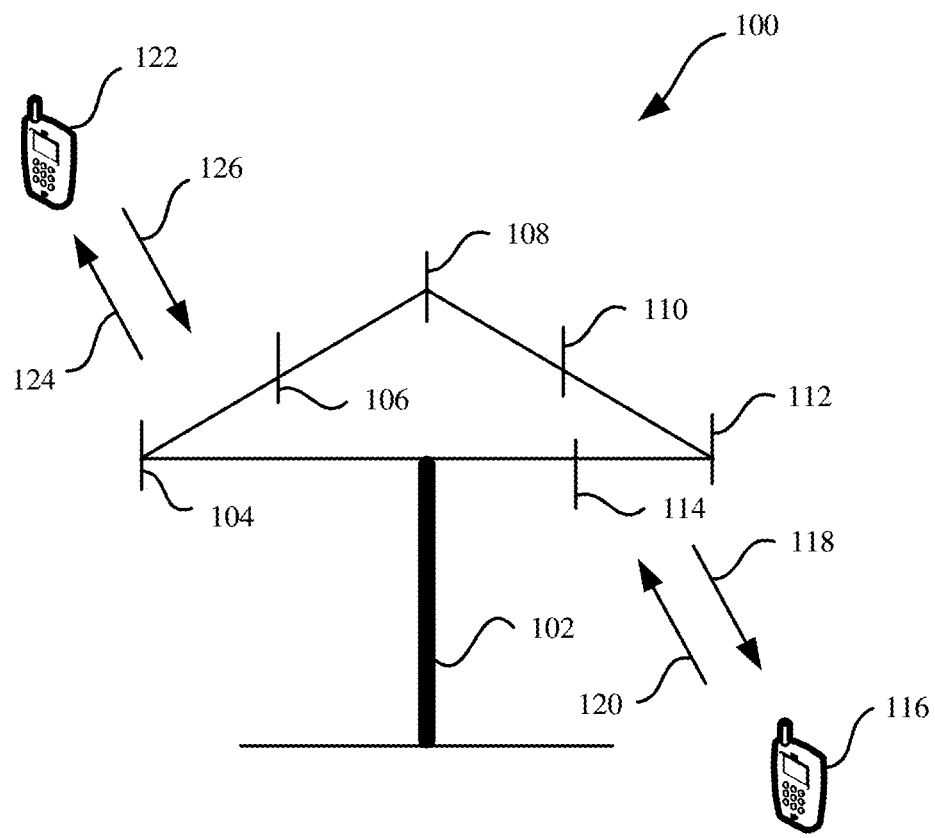
FIG. 1 is a schematic diagram of a scenario of a communication system 100 to which an embodiment of this application is applicable.

The following describes technical solutions in this application with reference to the accompanying drawings.

It should be understood that the technical solutions in embodiments of this application may be applied to various communication systems, for example, a long term evolution (Long Term Evolution, LTE) system, an LTE frequency division duplex (frequency division duplex, FDD) system, an LTE time division duplex (Time Division Duplex, TDD) system, a worldwide interoperability for microwave access (worldwide interoperability for microwave access, WiMAX) communication system, a future fifth generation (5th generation, 5G) system, a new radio (new radio, NR) system, or the like.

A type of a terminal device is not specifically limited in the embodiments of this application. For example, the terminal device may be user equipment (user equipment, UE), an access terminal, a subscriber unit, a subscriber station, a mobile station, a remote station, a remote terminal, a mobile device, a user terminal, a wireless network device, a user agent, or a user apparatus. The terminal may include but is not limited to a mobile station (mobile station, MS), a mobile phone (mobile phone), user equipment (user equipment, UE), a handset (handset), portable equipment (portable equipment), a cellular phone, a cordless phone, a session initiation protocol (session initiation protocol, SIP) phone, a wireless local loop (wireless local loop, WLL) station, a personal digital assistant (personal digital assistant, PDA), a radio frequency identification (radio frequency identification, RFID) terminal device for logistics, a handheld device or a computing device that has a wireless communication function, another device connected to a wireless modem, a vehicle-mounted device, a wearable device, a terminal device in an Internet of things or an Internet of vehicles, a terminal device in a future 5G network, a terminal device in a future evolved public land mobile network (public land mobile network, PLMN), or the like.

By way of example, and not limitation, in the embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that is directly worn on a body or integrated into clothes or an accessory of a user. The wearable device is a hardware device, and implements a powerful function through software support, data exchange, and cloud interaction. Generalized wearable intelligent devices include full-featured and large-size devices that can implement all or some functions without depending on smartphones, for example, smartwatches or smart glasses, and devices that focus on only one type of application function and need to work with other devices such as smartphones, for example, various smart bands or smart jewelry for monitoring physical signs.

A type of a network device is not specifically limited in this embodiment of this application, and may be any device configured to communicate with the terminal device. The network device may be, for example, an evolved NodeB (evolved NodeB, eNB or eNodeB) in a long term evolution (long term evolution, LTE) system, or may be a radio controller in a cloud radio access network (cloud radio access network, CRAN) scenario. Alternatively, the network device may be, for example, a relay station, an access point, a vehicle-mounted device, a wearable device, a network device in a future 5G network, a network device in a future evolved PLMN network, or the like.

In addition, in the embodiments of this application, the network device serves a cell, and the terminal device communicates with the network device by using a transmission resource (for example, a frequency domain resource or a spectrum resource) used in the cell. The cell may be a cell corresponding to the network device (for example, a base station). The cell may belong to a macro base station, or may belong to a base station corresponding to a small cell (small cell). Herein, the small cell may include: a metro cell (Metro cell), a micro cell (Micro cell), a pico cell (Pico cell), a femto cell (Femto cell), and the like, and the small cell has features of small coverage and low transmit power, and is applicable to providing a high-rate data transmission service.

A method provided in the embodiments of this application may be applied to the terminal device or the network device. The terminal device or the network device includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (which is also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, in the embodiments of this application, a specific structure of an entity for performing a communication method is not specially limited in the embodiments of this application, provided that the entity can run a program that records code of the communication method in the embodiments of this application, to perform communication according to the signal transmission method in the embodiments of this application. For example, a communication method in the embodiments of this application may be performed by a terminal device or a network device, or a function module that is in a terminal device or a network device and that can invoke a program and execute the program.

In addition, aspects or features in the embodiments of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card, and a flash memory component (for example, an erasable programmable read-only memory (erasable programmable read-only memory, EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

FIG. 1 is a schematic diagram of a scenario of a communication system 100 to which an embodiment of this application is applicable. As shown in FIG. 1, the communication system 100 includes a network device 102, and the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network device 102 may additionally include a transmitter chain and a receiver chain, and a person of ordinary skill in the art may understand that both of them may include a plurality of components (for example, a processor, a modulator, a multiplexer, a demodulator, a demultiplexer, and an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or the terminal device 122. The terminal devices 116 and 122 each may be, for example, a cellular phone, a smartphone, a portable computer, a handheld communication device, a handheld computing device, a satellite radio apparatus, a global positioning system, a PDA, and/or any other proper device configured to perform communication in the wireless communication system 100.

As shown in FIG. 1, the terminal device 116 communicates with the antennas 112 and 114. The antennas 112 and 114 send information to the terminal device 116 through a link 118, and receive information from the terminal device 116 through a link 120. In addition, the terminal device 122 communicates with the antennas 104 and 106. The antennas 104 and 106 send information to the terminal device 122 through a link 124, and receive information from the terminal device 122 through a link 126.

For example, in a frequency division duplex (frequency division duplex, FDD) system, for example, the link 116 may utilize a frequency band different from a frequency band used by the link 120, and the link 124 may utilize a frequency band different from a frequency band used by the link 126.

For another example, in a time division duplex (time division duplex, TDD) system and a full duplex (full duplex) system, the link 116 and the link 120 may use a same frequency band, and the link 124 and the link 126 may use a same frequency band.

Each antenna group and/or each area that are/is designed for communication are/is referred to as a sector of the network device 102. For example, the antenna group may be designed to communicate with a terminal device in a sector of a coverage area of the network device 102. In a process in which the network device 102 communicates with the terminal devices 116 and 122 through the links 116 and 124, a transmit antenna of the network device 102 may improve signal-to-noise ratios of the links 116 and 124 through beamforming. In addition, when the network device 102 sends, through beamforming, signals to the terminal device 116 and the terminal device 122 that are randomly scattered in a related coverage area, interference to a mobile device in a neighboring cell is less than that caused when a network device sends signals to all terminal devices of the network device by using a single antenna.

Within a given time, the network device 102, the terminal device 116, or the terminal device 122 may be a wireless communication sending apparatus and/or a wireless communication receiving apparatus. When sending data, the wireless communication sending apparatus may encode data for transmission. Specifically, the wireless communication sending apparatus may obtain (for example, generate, receive from another communication apparatus, or store in a memory) a specific quantity of data bits to be sent on a channel to the wireless communication receiving apparatus. The data bits may be included in a transport block (or a plurality of transport blocks) of the data, and the transport block may be segmented to generate a plurality of code blocks.

In addition, the communication system 100 may be a public land mobile network PLMN, a device-to-device (device-to-device, D2D) network, a machine-to-machine (machine-to-machine, M2M) network, or another network. FIG. 1 is merely a simplified schematic diagram of an example for ease of understanding. The network may further include another network device that is not shown in FIG. 1.

Figure 2:
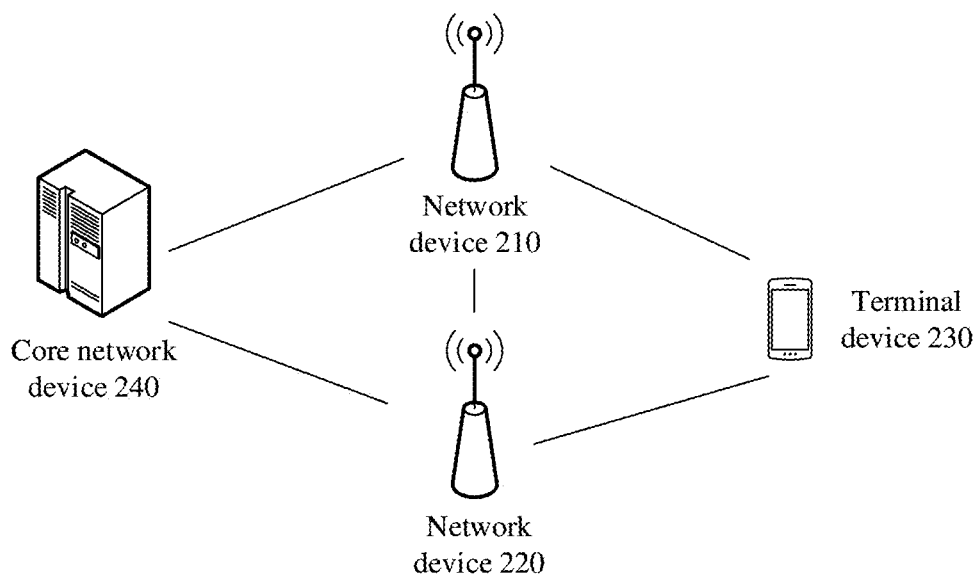
FIG. 2 is a schematic diagram of a communication system 200 applicable to this application.

FIG. 2 is a schematic diagram of a communication system 200 applicable to this application. As shown in FIG. 2, the communication system 200 may include at least two network devices, for example, a network device 210 and a network device 220, and the communication system 200 may further include at least one terminal device, for example, a terminal device 230. In addition, the communication system 200 may further include at least one core network device, for example, a core network device 240. It should be understood that FIG. 2 is only a schematic diagram. The communication system may further include other network devices, for example, a wireless relay device and a wireless backhaul device. In addition, quantities of network devices and terminal devices included in the mobile communication system are not limited in the embodiments of this application.

In FIG. 2, the terminal device 230 may be connected to the network device 210 and the network device 220 through an air interface, the network device 210 and the network device 220 may be connected in a wired or wireless manner, and the network device 210 and the network device 220 may be connected to the core network device 240 in a wired manner. The core network device 240 may be a 4G core network device, or may be a 5G core network device. The network device 210 may be an LTE base station or an NR base station, and the network device 220 may be an LTE base station or an NR base station. The terminal device 230 may communicate with the network device 210 and the network device 220 by using a dual connectivity (dual connectivity, DC) technology.

It should be understood that, according to the DC technology, two different network devices (for example, the network device 210 and the network device 220) can simultaneously provide a data transmission service for the terminal device 230. One network device may be referred to as a master base station or a master node (master node, MN), and the other network device is referred to as a secondary base station or a secondary node (secondary node, SN). It should be understood that the master base station may be a master gNB (master gNB, MgNB) in an NR standard or a master eNB (master eNB, MeNB) in an LTE standard, and the secondary base station may be a secondary gNB (secondary gNB, SgNB) in an NR standard or a secondary eNB (secondary eNB, SeNB) in an LTE standard. There are a plurality of combinations of DCs. The following separately describes a plurality of possible combinations of DCs by using examples with reference to FIG. 3 to FIG. 6.

Figure 3:
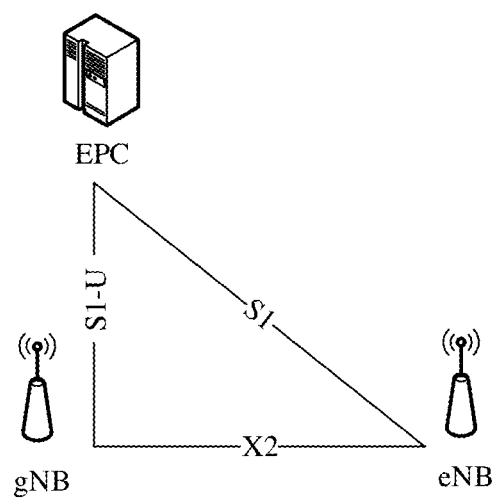
FIG. 3 is a schematic diagram of a DC architecture applicable to this application.

(1) When the core network device 240 is an evolved packet core (evolved packet core, EPC), an LTE base station serves as an MN, and an NR base station serves as an SN. The DC may also be referred to as EN-DC (E-UTRA NR DC). Refer to FIG. 3. In this case, the LTE base station may be connected to the NR base station through an X2 interface. At least a control plane connection is included, and a user plane connection may be further included. The LTE base station may be connected to the EPC through an S1 interface. At least a control plane connection is included, and a user plane connection may be further included. The NR base station may be connected to the EPC through an S1-U interface, that is, only a user plane connection may be included. In this case, the LTE base station may provide an air interface resource for the terminal device 230 by using at least one LTE cell. In this case, the at least one LTE cell is referred to as a master cell group (master cell group, MCG). Correspondingly, the NR base station may also provide an air interface resource for the terminal device 230 by using at least one NR cell. In this case, the at least one NR cell is referred to as a secondary cell group (secondary cell group, SCG).

Figure 4:
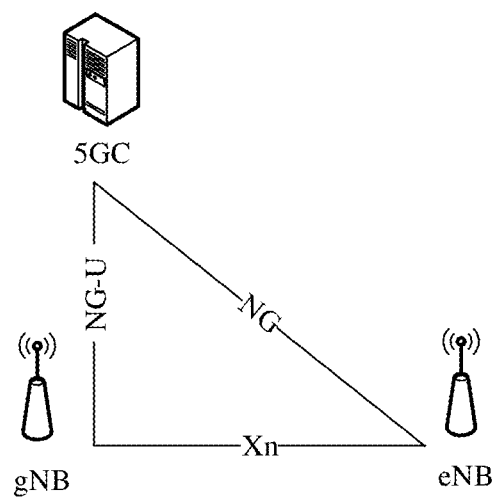
FIG. 4 is another schematic diagram of a DC architecture applicable to this application.

(2) When the core network device 240 is a 5G core (5G core, 5GC), an LTE base station serves as an MN, and an NR base station serves as an SN. The DC may alternatively be referred to as NGEN-DC (NG-RAN E-UTRA-NR dual connectivity). Refer to FIG. 4. In this case, the LTE base station may be connected to the NR base station through an Xn interface. At least a control plane connection is included, and a user plane connection may be further included. The LTE base station may be connected to the 5GC through an NG interface. At least a control plane connection is included, and a user plane connection may be further included. The NR base station may be connected to the 5GC through an NG-U interface, that is, only a user plane connection may be included. In this case, the LTE base station may provide an air interface resource for the terminal device 230 by using at least one LTE cell. In this case, the at least one LTE cell is referred to as an MCG. Correspondingly, the NR base station may also provide an air interface resource for the terminal device 230 by using at least one NR cell. In this case, the at least one NR cell is referred to as an SCG.

Figure 5:
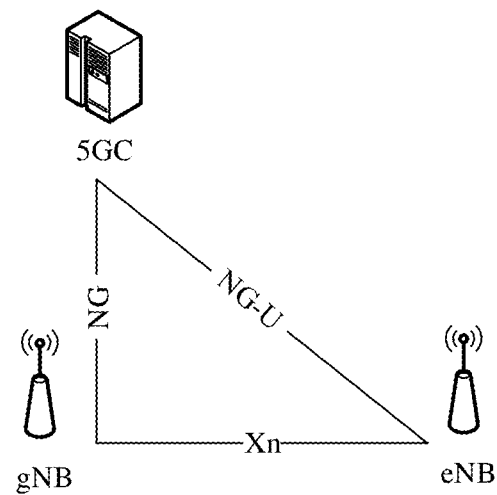
FIG. 5 is another schematic diagram of a DC architecture applicable to this application.

(3) When the core network device 240 is a 5GC, an NR base station serves as an MN, and an LTE base station serves as an SN. The DC may alternatively be referred to as NE-DC (NR-E-UTRA dual connectivity). Refer to FIG. 5. In this case, the NR base station may be connected to the LTE base station through an Xn interface. At least a control plane connection is included, and a user plane connection may be further included. The NR base station may be connected to the 5GC through an NG interface. At least a control plane connection is included, and a user plane connection may be further included. The LTE base station is connected to the 5GC through an NG-U interface, that is, only a user plane connection may be included. In this case, the NR base station may provide an air interface resource for the terminal device 230 by using at least one NR cell. In this case, the at least one NR cell is referred to as an MCG. Correspondingly, the LTE base station may also provide an air interface resource for the terminal device 230 by using at least one LTE cell. In this case, the at least one LTE cell is referred to as an SCG.

Figure 6:
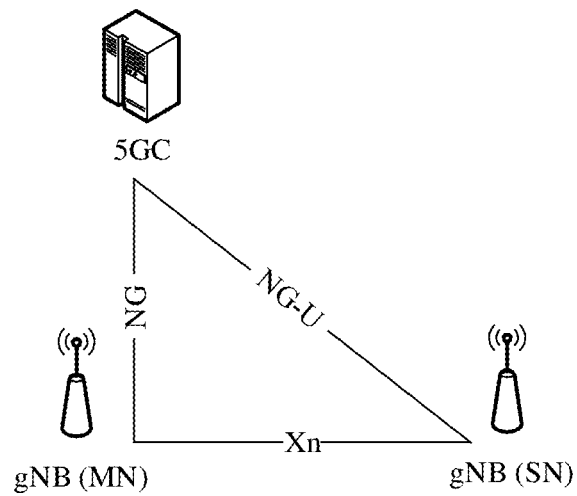
FIG. 6 is another schematic diagram of a DC architecture applicable to this application.

(4) When the core network device 240 is a 5GC, both an MN and an SN are NR base stations. The DC may alternatively be referred to as an NR-NR DC. Refer to FIG. 6. Both the master base station and the secondary base station are NR base stations, and the NR master base station may be connected to the NR secondary base station through an Xn interface. At least a control plane connection is included, and a user plane connection may be further included. The NR master base station is connected to the 5GC through an NG interface. At least a control plane connection is included, and a user plane connection may be further included. The NR secondary base station is connected to the 5GC through an NG-U interface, that is, only a user plane connection may be included. In this case, the NR master base station may provide an air interface resource for the terminal device 230 by using at least one NR cell. In this case, the at least one NR cell is referred to as an MCG. Correspondingly, the NR secondary base station may also provide an air interface resource for the terminal device 230 by using at least one NR cell. In this case, the at least one NR cell is referred to as an SCG.

It should be understood that in FIG. 3 to FIG. 6, an example in which the LTE base station is an eNB and the NR base station is a gNB is used for description. However, this shall not constitute any limitation on this application. It should be further understood that the foregoing several DC combinations are merely used as examples for description, and the embodiments of this application should not be limited to the foregoing several DC combinations.

In the DC technology, the secondary node SN and the master node MN can simultaneously provide data transmission services for the terminal device. The terminal device may determine a key between the terminal device and the secondary node SN based on a key between the terminal device and the master node MN. Specifically, a signaling radio bearer (signaling radio bearer, SRB) is used as an example. The master node MN may calculate a key (for example, S-KgNB) of the secondary node SN based on a key (for example, KgNB) of the master node MN and an sk-counter value of the master node MN. A radio resource control (radio resource control, RRC) reconfiguration message sent by the master node MN to the terminal device may include the sk-counter value. The terminal device determines, based on the key (for example, KgNB) and the sk-counter value, for signaling transmission performed between the terminal device and the master node MN by using the SRB, the key for signaling transmission performed between the terminal device and the secondary node SN by using the SRB.

It should be noted that the sk-counter value is one of parameters used in a key derivation process, and the sk-counter value may be a value specified in a protocol, for example, an integer greater than or equal to 0 and less than or equal to 65535.

Specifically, the master node MN may transmit signaling, for example, the RRC reconfiguration message, to the terminal device by using a first SRB. The secondary node SN may transmit signaling to the terminal device by using a second SRB. The first SRB is a bearer for signaling transmission performed between the terminal device and the master node, and the second SRB is a bearer for signaling transmission performed between the terminal device and the secondary node.

The first SRB may be SRB1 or SRB2. After security activation is performed at an access stratum (access stratum, AS), a network may configure SRB2, where SRB2 is used to send a non-access stratum (non-access stratum, NAS) message on a dedicated control channel (dedicated control channel, DCCH). SRB1 is used to send a radio resource control (radio resource control, RRC) message, or is used to send a NAS message on a DCCH before SRB2 is established. A priority of SRB2 is lower than that of SRB1.

When EN-DC, NR-DC, NGEN-DC, NE-DC, or MR-DC is configured for the terminal device, the second SRB may be SRB3, used to send a specific RRC message on a DCCH. The specific RRC message may be, for example, an RRC reconfiguration message including measurement configuration information, or may be a measurement report.

Specifically, an RRC reconfiguration message used to indicate to add a secondary node may include a secondary cell group configuration (secondary cell group configuration) information element. An RRC reconfiguration message used to indicate handover may carry a reconfiguration with sync (reconfiguration with sync) information element or a mobility control (mobilitycontrolinfo) information element.

In a 5G system, a base station is referred to as a gNB, and may include one or more of a radio resource control (radio resource control, RRC) layer, a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical (physical, PHY) layer. The base station may include a central unit (centralized unit, CU) and a distributed unit (distributed unit, DU).

One CU may be connected to one DU, or a plurality of DUs may share one CU. This can reduce costs and facilitate network expansion. The CU and the DU may be divided according to a protocol stack. In a possible manner, the RRC layer, the SDAP layer, and the PDCP layer are deployed on the CU, and the remaining RLC layer, the MAC layer, and the physical layer are deployed on the DU. For example, refer to FIG. 7(a). A CU and a DU are connected by using an F1 interface. The CU represents a gNB and is connected to a core network through an NG interface.

Figure 7A:
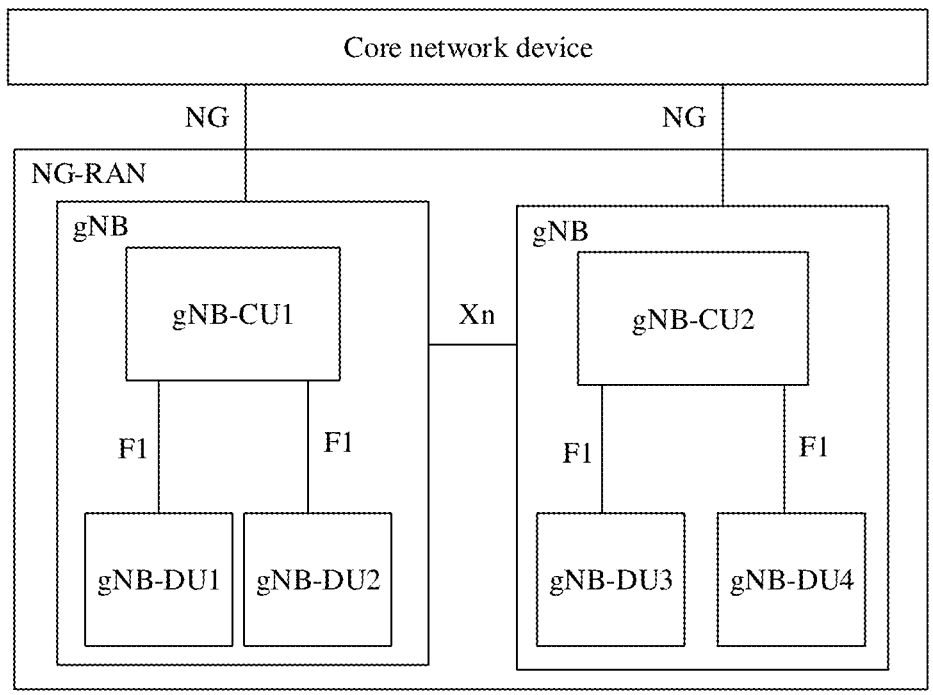
FIG. 7(a) is another schematic diagram of a DC architecture applicable to this application.

It should be noted that in FIG. 7(a), an example in which two DUs share one CU is used for description. In this embodiment of this application, a plurality of DUs may also share one CU. This is not specifically limited.

Figure 7B:
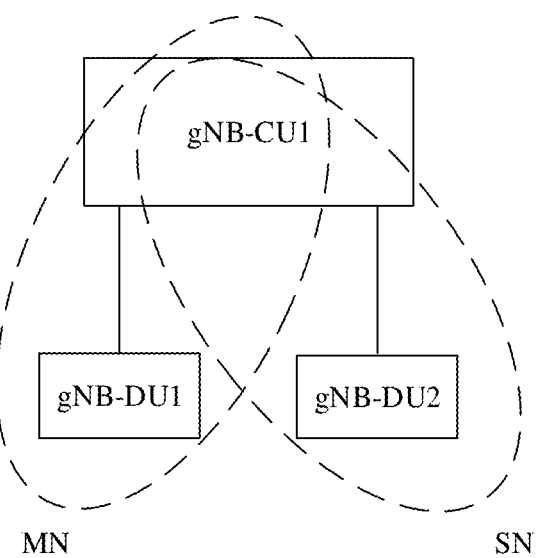
FIG. 7(b) is a schematic diagram of a possible scenario applicable to this application.

FIG. 7(b) provides a scenario to which an embodiment of this application is applicable. Specifically, as shown in FIG. 7(b), one DU and one CU together form one node. To be specific, DU1 and CU1 may be considered as one node, and DU2 and CU1 may be considered as another node. For example, DU1 and CU1 are a master node MN, and DU2 and CU1 are a secondary node SN. A terminal device may be both connected to DU1 and CU1 that serve as the master node and DU2 and CU1 that serve as the secondary node SN. The secondary node SN and the master node MN can simultaneously provide data transmission services for the terminal device.

For a DC scenario described in FIG. 7(b), a CU (or a PDCP) is responsible for generating/processing a key. For the secondary node SN and the master node MN both connected to the terminal device, because DU1 and CU1 that are used as the master node and DU2 and CU1 that are used as the secondary node have a common CU (namely, CU1), a key (for example, KgNB) for transmitting, by using a first SRB, signaling between the terminal device and the master node including DU1 and CU1 is the same as a key (for example, an S-KgNB) for transmitting, by using a second SRB, signaling between the terminal device and the secondary node including DU2 and CU1. In a conventional DC solution, when signaling transmission is performed between a terminal device and a secondary node by using a second SRB, the terminal device needs to determine, based on a key (for example, KgNB) for signaling transmission performed between the terminal device and a master node MN by using a first SRB and an sk-counter value, a key (for example, an S-KgNB) for signaling transmission performed between the terminal device and the secondary node SN by using the second SRB. This introduces implementation complexity.

In the communication method provided in this embodiment of this application, in a scenario in which the master node MN and the secondary node SN share one CU, the terminal device may determine that the key for signaling transmission performed between the terminal device and the secondary node SN by using the second SRB is the same as the key for signaling transmission performed between the terminal device and the master node MN by using the first SRB. Therefore, when signaling transmission is performed between the terminal device and the secondary node SN by using the second SRB, the terminal device may use the key (for example, KgNB) corresponding to the MN, and does not need to derive, based on the key (namely, KgNB) corresponding to the MN, the key (for example, S-KgNB) used for signaling transmission performed between the terminal device and the secondary node SN by using the second SRB. Therefore, implementation complexity is reduced and resources are saved.

Figure 8:
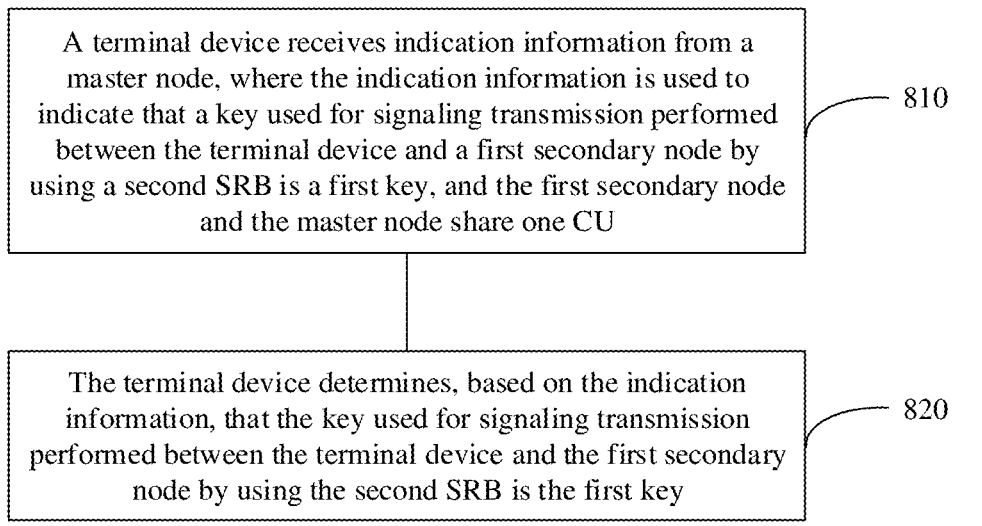
FIG. 8 is a schematic flowchart of a communication method according to an embodiment of this application.

FIG. 8 is a schematic flowchart of a communication method according to an embodiment of this application. As shown in FIG. 8, the method may include steps 810 and 820. The following separately describes steps 810 and 820 in detail.

Step 810: A terminal device receives indication information from a master node, where the indication information is used to indicate that a key used for signaling transmission performed between the terminal device and a first secondary node by using a second SRB is a first key, and the first secondary node and the master node share one CU.

FIG. 7(b) is used as an example. DU1 and CU1 may be used as the master node MN, and DU2 and CU1 shown in FIG. 7(b) are used as the first secondary node SN.

It should be understood that the first key is a key used for signaling transmission performed between the terminal device and the master node by using a first SRB, or the first key is a key (for example, KgNB) corresponding to the master node. For description of the first SRB and the second SRB, refer to the foregoing description. Details are not described herein again.

In this embodiment of this application, the indication information may be carried in an RRC reconfiguration message. The RRC reconfiguration message may be used to instruct the terminal device to add the first secondary node SN to serve as a secondary node in a DC architecture. Alternatively, the RRC reconfiguration message is used to instruct the terminal device to be handed over to a secondary node (or change a secondary node). For example, the RRC reconfiguration message instructs the terminal device to be handed over (or change) from a second secondary node to the first secondary node. After handover (or after the secondary node is changed), the first secondary node and the master node share one central unit CU.

Specifically, when the terminal device is instructed to add the first secondary node SN to serve as the secondary node in the DC architecture, the RRC reconfiguration message may carry a secondary cell group configuration (secondary cell group configuration) information element that is used to include related configuration information required when the secondary node is added. Alternatively, when the RRC reconfiguration message is used to instruct the terminal device to be handed over to a secondary node (or change a secondary node), in an NR system, the RRC reconfiguration message may carry a reconfiguration with sync information element that is used to include related configuration information required for handover of the secondary node (or change of the secondary node); in an LTE system, the RRC reconfiguration message carries a mobility control info information element that is used to include related configuration information required for handover of the secondary node (or change of the secondary node).

Step 820: The terminal device determines, based on the indication information, that the key used for signaling transmission performed between the terminal device and the first secondary node by using the second SRB is the first key.

In a possible implementation, the RRC reconfiguration message may include first information, and the first information is used to indicate that the key used for signaling transmission performed between the terminal device and the first secondary node SN by using the second SRB is the first key. Specifically, the first information may be represented by a binary value. For example, "0" indicates that the key used for signaling transmission performed between the terminal device and the first secondary node SN by using the second SRB is different from the first key, and "1" indicates that the key used for signaling transmission performed between the terminal device and the first secondary node SN by using the second SRB is the same as the first key. Alternatively, the first information may be represented by a Boolean value. For example, "FALSE" indicates that the key used for signaling transmission performed between the terminal device and the first secondary node SN by using the second SRB is different from the first key, and "TRUE" indicates that the key used for signaling transmission performed between the terminal device and the first secondary node SN by using the second SRB is the same as the first key. Alternatively, the first information may be represented by an information element. For example, the information element is "master key". If the RRC reconfiguration message does not include the information element, it is indicated that the key used for signaling transmission performed between the terminal device and the first secondary node SN by using the second SRB is different from the first key; if the RRC reconfiguration message includes the information element, it is indicated that the key used for signaling transmission performed between the terminal device and the first secondary node SN by using the second SRB is the same as the first key. Alternatively, the first information has another representation form. This is not limited in this embodiment. The terminal device may determine, based on the first information included in the RRC reconfiguration message, the key used for signaling transmission performed between the terminal device and the first secondary node by using the second SRB. For example, if the first information is the Boolean value "TRUE", the terminal device determines that the key used for signaling transmission performed between the terminal device and the first secondary node by using the second SRB is the first key. In this case, the indication information in step 820 includes the first information.

In another possible implementation, a network configures an sk-counter value, where the RRC reconfiguration message includes the sk-counter value, and the sk-counter value is a preset value (for example, the sk-counter value is infinite or infinitesimal, or another special value (for example, the special value is not within a value range, of an sk-counter, defined in an existing protocol), and this is not limited). When the sk-counter value is a preset value, it may be implicitly indicated that the key used for signaling transmission performed between the terminal device and the first secondary node by using the second SRB is the first key. In this case, the indication information in step 820 is an sk-counter value that belongs to a preset range or is a preset value. The terminal device may determine, based on a case in which the RRC reconfiguration message includes the preset sk-counter value, that the key used for signaling transmission performed between the terminal device and the first secondary node by using the second SRB is the first key.

In another possible implementation, the RRC reconfiguration message includes first information and an sk-counter value. The sk-counter value may be within a value range, of an sk-counter, defined in an existing protocol. Alternatively, the sk-counter value is a preset value (for example, the sk-counter value is infinite or infinitesimal, or another special value (for example, the special value is not within a value range, of an sk-counter, defined in an existing protocol), and this is not limited). The first information is used to indicate that the key used for signaling transmission performed between the terminal device and the first secondary node SN by using the second SRB is the first key. Specifically, for a representation form of the first information, refer to the foregoing corresponding description of the first information. Details are not described again. The terminal device may determine, based on the first information and/or the sk-counter value included in the RRC reconfiguration message, that the key used for signaling transmission performed between the terminal device and the first secondary node by using the second SRB is the first key. In this case, the indication information in step 820 may include the first information and/or the sk-counter value that belongs to a preset range or is a preset value.

In another possible implementation, a network does not configure an sk-counter value, in other words, the RRC reconfiguration message does not include the sk-counter value. It may be implicitly indicated that the key used for signaling transmission performed between the terminal device and the first secondary node by using the second SRB is the first key. The terminal device may determine, based on a case in which the RRC reconfiguration message does not include the sk-counter value, that the key used for signaling transmission performed between the terminal device and the first secondary node by using the second SRB is the first key. In this case, the indication information in step 820 may be that the RRC reconfiguration message does not include the sk-counter value.

In the foregoing technical solution, in a scenario in which the master node and the first secondary node share one CU, the terminal device determines that the key used for signaling transmission performed between the terminal device and the first secondary node is the same as the key used for signaling transmission performed between the terminal device and the master node. This avoids complexity caused by deriving a key used for signaling transmission performed between the terminal device and the first secondary node.

It may be understood that the terminal device or the network device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

Figure 9:
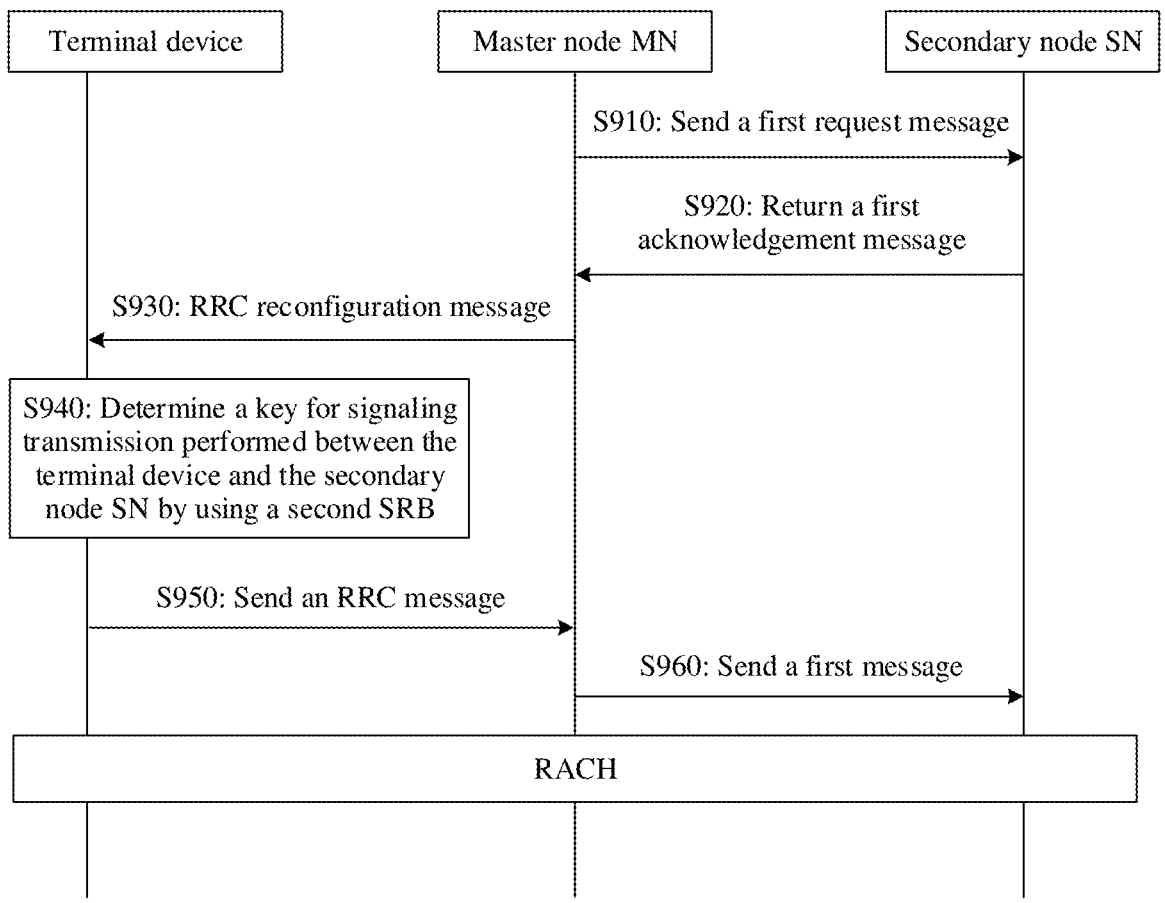
FIG. 9 is another schematic flowchart of a communication method according to an embodiment of this application.

A process of adding a secondary node in a DC scenario is used as an example below to describe a specific implementation in an embodiment of this application in more detail with reference to FIG. 9. It should be noted that the example in FIG. 9 is merely intended to help a person skilled in the art understand the embodiments of this application, and is not intended to limit the embodiments of this application to a specific value or a specific scenario of the example. A person skilled in the art can definitely make various equivalent modifications or changes based on the example shown in FIG. 9, and such modifications and changes also fall within the scope of the embodiments of this application.

FIG. 9 is another schematic flowchart of a communication method according to an embodiment of this application. As shown in FIG. 9, the method may include steps 910 to 960. The following separately describes steps 910 to 960 in detail.

It should be understood that DU1 and CU1 shown in FIG. 7(*b*) may be used as a master node MN, and DU2 and CU1 shown in FIG. 7(*b*) are used as a secondary node SN.

Step 910: The master node MN sends a first request message to the secondary node SN, where the first request message is used to request to add the secondary node. Optionally, the first request message is a secondary node addition request message.

Step 920: The secondary node SN returns a first acknowledgement message to the master node MN, where the first acknowledgement message is used to notify the master node that the secondary node addition request is allowed/admitted. Optionally, the first acknowledgement message is a secondary node addition request acknowledgement message.

Specifically, in an example, after receiving the first request message sent by the master node MN, for example, the secondary node addition request message, the secondary node SN may perform corresponding secondary node configuration, and return the first acknowledgement message to the master node MN. The first acknowledgement message is used to indicate that the secondary node SN has successfully received the secondary node addition request message. In an example, the first acknowledgement message may be, for example, a secondary node SN addition request acknowledgement (SN addition request acknowledgement, SN addition request ACK) message.

Step 930: The master node MN sends a radio resource control (radio resource control, RRC) reconfiguration message to a terminal device, where the RRC reconfiguration message carries a secondary cell group configuration information element.

After receiving the secondary node addition request acknowledgement message returned by the secondary node SN, the master node MN may send the RRC reconfiguration message to the terminal device, where the RRC reconfiguration message carries a secondary cell group configuration information element, and is used to indicate the terminal device to add a secondary node SN. The terminal device configures the secondary node based on the secondary cell group configuration information element, and adds the node indicated in the RRC reconfiguration message as the secondary node.

In this embodiment of this application, the RRC reconfiguration message is further used to indicate that a key used for signaling transmission performed between the terminal device and the secondary node SN by using a second SRB is a first key. The first key is a key (for example, KgNB) used for signaling transmission performed between the terminal device and the master node MN by using a first SRB. There are a plurality of specific implementations. In a possible implementation, the RRC reconfiguration message may include indication information, and the indication information is used to indicate that the key used for signaling transmission performed between the terminal device and the secondary node SN by using the second SRB is the first key. In another possible implementation, the RRC reconfiguration message may include an sk-counter value, and the sk-counter value is a preset value (for example, the sk-counter value is infinite or infinitesimal, or another special value (for example, the special value is not within a value range, of an sk-counter value, defined in an existing protocol), and this is not limited). When the sk-counter value is a preset value, it may be implicitly indicated that the key used for signaling transmission performed between the terminal device and the secondary node by using the second SRB is the first key. In another possible implementation, the RRC reconfiguration message may include indication information and an sk-counter value. In another possible implementation, the RRC reconfiguration message does not include an sk-counter value. It may be implicitly indicated that the key used for signaling transmission performed between the terminal device and the secondary node by using the second SRB is the first key.

Optionally, before step 930, the master node MN may further send information about the first key to the terminal device, and the terminal device may derive, based on the information about the first key, the first key (for example, KgNB) used for signaling transmission performed between the terminal device and the master node MN by using the first SRB.

Step 940: The terminal device determines, based on the RRC reconfiguration message, that the key used for signaling transmission performed between the terminal device and the secondary node by using the second SRB is the first key.

There are a plurality of implementations in which the terminal device determines, based on the RRC reconfiguration message, that the key used for signaling transmission performed between the terminal device and the secondary node by using the second SRB is the first key. This is not specifically limited in this application.

In a possible implementation, the RRC reconfiguration message may include first information, and the first information is used to indicate that the key used for signaling transmission performed between the terminal device and the secondary node SN by using the second SRB is the first key. The terminal device may determine, based on the first information included in the RRC reconfiguration message, that the key used for signaling transmission performed between the terminal device and the first secondary node by using the second SRB is the first key. Specifically, for a representation form of the first information, refer to the corresponding description of the first information in step 820. Details are not described again.

In another possible implementation, a network configures the sk-counter value, where the RRC reconfiguration message includes the sk-counter value, and the sk-counter value is a preset value (for example, the sk-counter value is infinite or infinitesimal, or another special value (for example, the special value is not within the value range, of the sk-counter, defined in the existing protocol), and this is not limited). In this case, the indication information is an sk-counter value that belongs to a preset range or is a preset value. When the sk-counter value is a preset value, it may be implicitly indicated that the key used for signaling transmission performed between the terminal device and the secondary node by using the second SRB is the first key. The terminal device may determine, based on the preset sk-counter value included in the RRC reconfiguration message, that the key used for signaling transmission performed between the terminal device and the first secondary node by using the second SRB is the first key.

In another possible implementation, the RRC reconfiguration message includes first information and the sk-counter value. The sk-counter value may be within a value range, of an sk-counter, defined in an existing protocol. Alternatively, the sk-counter value is a preset value (for example, the sk-counter value is infinite or infinitesimal, or another special value (for example, the special value is not within a value range, of an sk-counter, defined in an existing protocol), and this is not limited). The first information is used to indicate that the key used for signaling transmission performed between the terminal device and the secondary node SN by using the second SRB is the first key. Specifically, for a representation form of the first information, refer to the corresponding description of the first information in step 820. Details are not described again. The terminal device may determine, based on the first information and/or the sk-counter value included in the RRC reconfiguration message, that the key used for signaling transmission performed between the terminal device and the first secondary node by using the second SRB is the first key.

In another possible implementation, a network does not configure the sk-counter value, in other words, the RRC reconfiguration message does not include the sk-counter value. It may be implicitly indicated that the key used for signaling transmission performed between the terminal device and the first secondary node by using the second SRB is the first key. The terminal device may determine, based on a case in which the RRC reconfiguration message does not include the sk-counter value, that the key used for signaling transmission performed between the terminal device and the first secondary node by using the second SRB is the first key.

Step 950: The terminal device sends an RRC message to the master node MN, where the RRC message is used to indicate that RRC reconfiguration has been completed. Optionally, the RRC message is an RRC reconfiguration complete message.

Step 960: The master node MN sends a first message to the secondary node SN, where the first message is used to indicate that the terminal device has completed a secondary node addition process. Optionally, the first message is a secondary node reconfiguration complete message.

The terminal device may perform random access to the secondary node SN by using a random access channel (random access channel, RACH) procedure. After the terminal device completes the secondary node addition process, the master node MN and the secondary node SN may both provide data transmission services for the terminal device.

It may be understood that the terminal device or the network device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

In the foregoing technical solution, in a scenario in which the secondary node SN is added, and the master node MN and the secondary node SN share one CU, the terminal device may determine, based on the RRC reconfiguration message, that the key (namely, KgNB) corresponding to the MN may be used when signaling transmission is performed between the terminal device and the secondary node SN by using the second SRB. The key used when signaling transmission is performed between the terminal device and the secondary node SN by using the second SRB does not need to be derived according to KgNB. This reduces implementation complexity and saves resources.

Figure 10A:
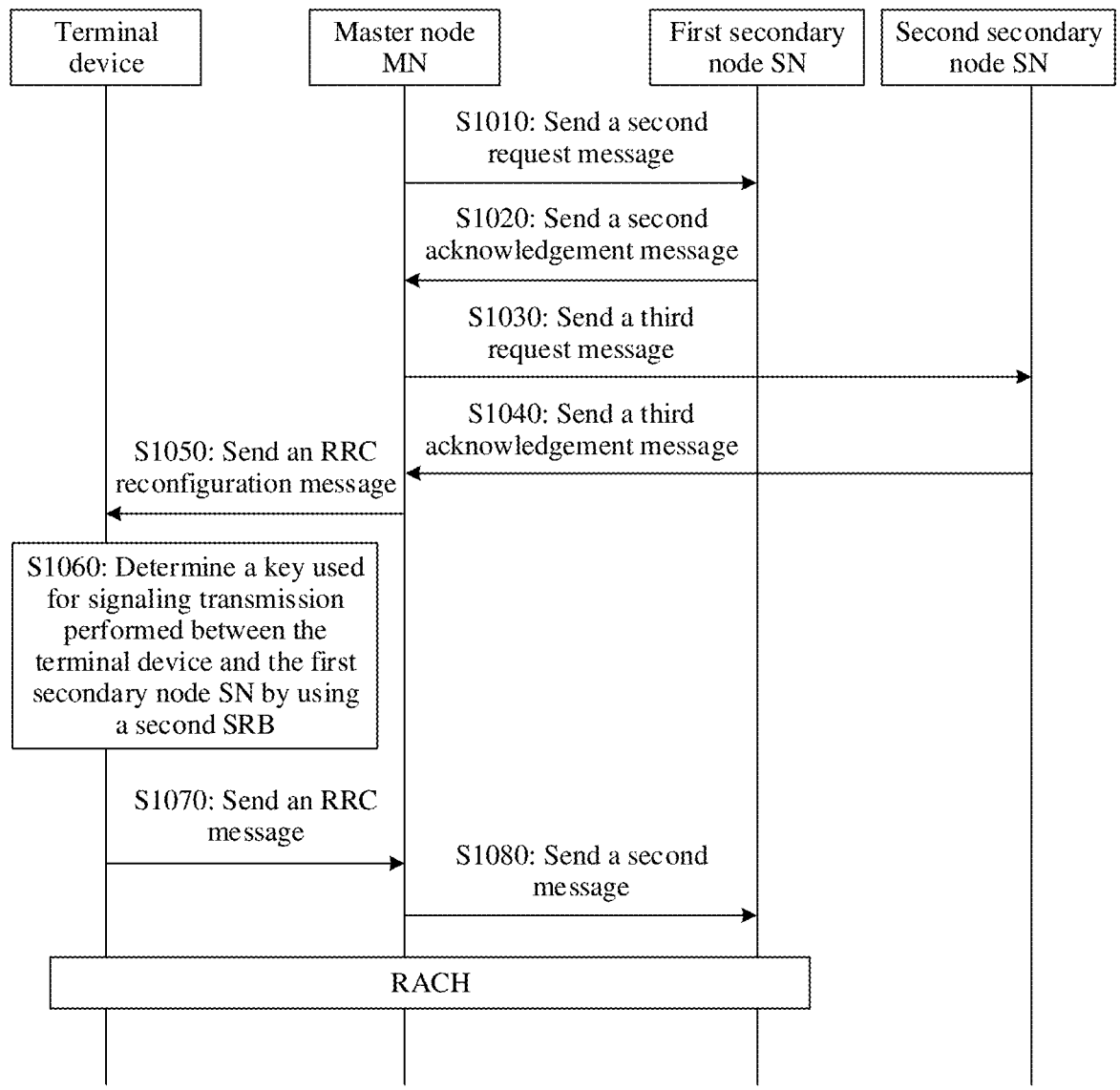
FIG. 10(a) is another schematic flowchart of a communication method according to an embodiment of this application.
Figure 10B:
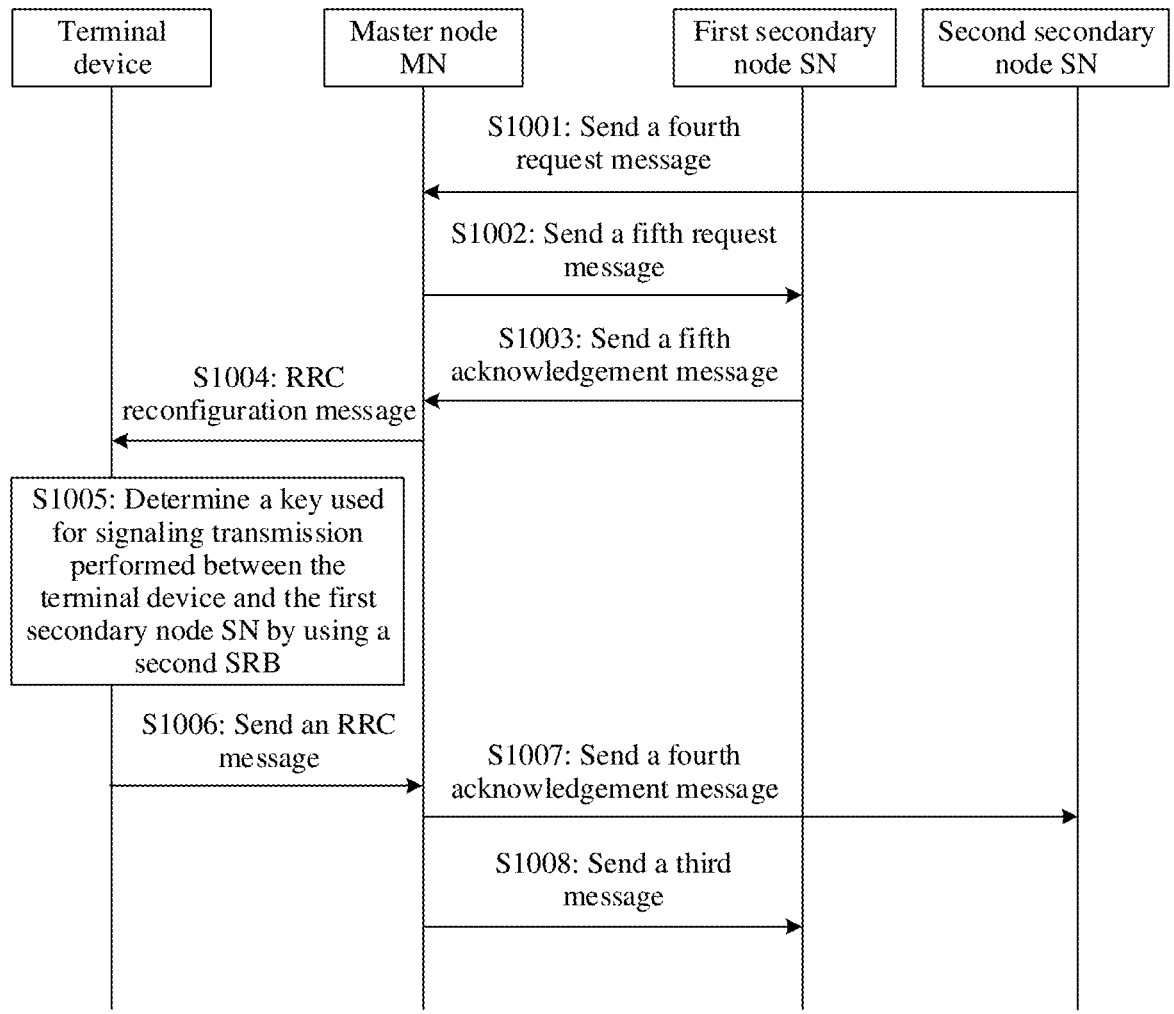
FIG. 10(b) is another schematic flowchart of a communication method according to an embodiment of this application.

The following uses a secondary node handover/change procedure in a DC scenario as an example to describe a specific implementation in an embodiment of this application in more detail with reference to FIG. 10(a) and FIG. 10(b). It should be noted that the examples in FIG. 10(a) and FIG. 10(b) are merely intended to help a person skilled in the art understand the embodiments of this application, and is not intended to limit the embodiments of this application to a specific value or a specific scenario of the example. A person skilled in the art can definitely make various equivalent modifications or changes based on the examples shown in FIG. 10(a) and FIG. 10(b), and such modifications and changes also fall within the scope of the embodiments of this application.

FIG. 10(a) is another schematic flowchart of a communication method according to an embodiment of this application, and is used in secondary node change/handover initiated by a master node. As shown in FIG. 10(a), the method may include steps 1010 to 1080. The following separately describes steps 1010 to 1080 in detail.

It should be understood that the master node in FIG. 10(a) is DU1 and CU1 shown in FIG. 7(b), a first secondary node is DU2 and CU1 shown in FIG. 7(b), and a second secondary node may include, for example, DU3 and CU2.

Step 1010: The master node MN sends a second request message to the first secondary node, where the second request message is used to request to add the first secondary node as a secondary node. Optionally, the second request message is a secondary node addition request message.

Step 1020: The first secondary node returns a second acknowledgement message to the MN, where the second acknowledgement message is used to notify the master node that the secondary node addition request is allowed/admitted. Optionally, the second acknowledgement message is a secondary node addition request acknowledgement message.

Specifically, in an example, after receiving the second request message sent by the master node MN, for example, the secondary node addition request message, the first secondary node may perform corresponding secondary node configuration, and return the second acknowledgement message to the master node MN. The second acknowledgement message is used to indicate that the first secondary node SN has successfully received the secondary node addition request message. For example, the second acknowledgement message may be, for example, an SN addition request ACK message.

Step 1030: The MN sends a third request message to the second secondary node, where the third request message is used to request to release the secondary node. For example, the third request message is a secondary node release request message.

Step 1040: The second secondary node sends a third acknowledgement message to the MN, for example, the third acknowledgement message is a secondary node SN release request acknowledgement message.

After receiving the third request message sent by the MN, for example, the secondary node release request message, the second secondary node may release a related resource, and return the third acknowledgement message to the MN, where the third acknowledgement message is used to indicate that the second secondary node has released the related resource. The third acknowledgement message may be, for example, a secondary node SN release request acknowledgement (SN release request acknowledgement, SN release request ACK) message.

Step 1050: The MN sends an RRC reconfiguration message to a terminal device, where the RRC reconfiguration message indicates the terminal device to perform secondary node handover/change.

Specifically, the secondary node is handed over/changed from the second secondary node to the first secondary node. To be specific, before secondary node handover/change, the MN and the second secondary node may provide services for the terminal device; after secondary node handover/change, the MN and the first secondary node may provide services for the terminal device.

After receiving the secondary node release request acknowledgement message returned by the second secondary node, the master node MN may send the RRC reconfiguration message to the terminal device. When the MN is a gNB, the RRC reconfiguration message sent by the MN to the UE may carry a reconfiguration with sync information element that is used to indicate the terminal device to be handed over from/change the second secondary node to the first secondary node. When the MN is an eNB, the RRC reconfiguration message sent by the MN to the UE may carry a mobility control info information element that is used to instruct the terminal device to be handed over from/change the second secondary node to the first secondary node.

In this embodiment of this application, the master node MN determines that the first secondary node after secondary node handover/change is DU2 and CU1, and shares CU1 with DU1 and CU1 that serve as the master node MN. Therefore, the RRC reconfiguration message is further used to indicate that a key used for signaling transmission performed between the terminal device and the first secondary node by using a second SRB is a first key, and the first key is a key (for example, KgNB) used for signaling transmission performed between the terminal device and the master node MN by using a first SRB. There are a plurality of specific implementations. In a possible implementation, the RRC reconfiguration message may include indication information, and the indication information is used to indicate that the key used for signaling transmission performed between the terminal device and the first secondary node by using the second SRB is the first key. In another possible implementation, the RRC reconfiguration message may include an sk-counter value, and the sk-counter value is a preset value (for example, the sk-counter value is infinite or infinitesimal, or another special value (for example, the special value is not within a value range, of an sk-counter, defined in an existing protocol), and this is not limited). When the sk-counter value is a preset value, it may be implicitly indicated that the key used for signaling transmission performed between the terminal device and the first secondary node by using the second SRB is the first key. In another possible implementation, the RRC reconfiguration message may include indication information and an sk-counter value. In another possible implementation, the RRC reconfiguration message does not include an sk-counter value. It may be implicitly indicated that the key used for signaling transmission performed between the terminal device and the first secondary node by using the second SRB is the first key.

Optionally, before step 1010, the master node MN may further send information about the first key to the terminal device, and the terminal device may derive, based on the information about the first key, the first key (for example, KgNB) used for signaling transmission performed between the terminal device and the master node MN by using the first SRB.

Step 1060: The terminal device determines, based on the RRC reconfiguration message, that the key used for signaling transmission performed between the terminal device and the first secondary node by using the second SRB is the first key.

A specific implementation in which the terminal device determines, based on the RRC reconfiguration message, that the key used for signaling transmission performed between the terminal device and the first secondary node by using the second SRB is the first key corresponds to step 940. For details, refer to the description in step 940. Details are not described herein again.

Step 1070: The terminal device sends an RRC message to the master node MN, where the RRC message is used to indicate that secondary node handover/change has been completed. Optionally, the RRC message is an RRC reconfiguration complete message.

Step 1080: The master node MN sends a second message to the first secondary node, where the second message is used to indicate that the terminal device has completed a secondary node handover/change process. Optionally, the second message is a secondary node reconfiguration complete message.

It may be understood that the terminal device or the network device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

FIG. 10(*b*) is another schematic flowchart of a communication method according to an embodiment of this application, and is used in secondary node change/handover actively initiated by a secondary node. As shown in FIG. 10(*b*), the method may include steps 1001 to 1008. The following separately describes steps 1001 to 1008 in detail.

It should be understood that the master node in FIG. 10(*b*) is DU1 and CU1 shown in FIG. 7(*b*), a first secondary node is DU2 and CU1 shown in FIG. 7(*b*), and a second secondary node may include, for example, DU3 and CU2.

Step 1001: The second secondary node sends a fourth request message to the MN, where the fourth request message is used to request to change a secondary node. Optionally, the fourth request message may be, for example, a secondary node change request message.

Step 1002: The master node MN sends a fifth request message to the first secondary node, where the fifth request message is used to request to add the first secondary node as the secondary node. Optionally, the fifth request message may be, for example, a secondary node addition request message.

Step 1003: The first secondary node returns a fifth acknowledgement message to the MN, where the fifth acknowledgement message is used to indicate that the first secondary node SN has allowed/admitted the secondary node addition request message. Optionally, the fifth acknowledgement message may be, for example, an SN addition request ACK message.

Specifically, in an example, after receiving the secondary node addition request message sent by the master node MN, the first secondary node may perform corresponding secondary node configuration, and return the SN addition request ACK message to the master node MN.

Step 1004: The MN sends an RRC reconfiguration message to a terminal device, where the RRC reconfiguration message indicates the terminal device to perform secondary node handover/change.

Specifically, the secondary node is handed over/changed from the second secondary node to the first secondary node. To be specific, before secondary node handover/change, the MN and the second secondary node may provide a service for the terminal device; after secondary node handover/change, the MN and the first secondary node may provide a service for the terminal device.

After receiving the secondary node addition request acknowledgement message returned by the first secondary node, the master node MN may send the RRC reconfiguration message to the terminal device. When the MN is a gNB, the RRC reconfiguration message sent by the MN to the UE may carry a reconfiguration with sync information element that is used to indicate the terminal device to be handed over from/change the second secondary node to the first secondary node. When the MN is an eNB, the RRC reconfiguration message sent by the MN to the UE may carry a mobility control info information element that is used to instruct the terminal device to be handed over from/change the second secondary node to the first secondary node.

In this embodiment of this application, the master node MN determines that the first secondary node after secondary node handover/change is DU2 and CU1, and shares CU1 with DU1 and CU1 that serve as the master node MN. Therefore, the RRC reconfiguration message is further used to indicate that a key used for signaling transmission performed between the terminal device and the first secondary node by using a second SRB is a first key, and the first key is a key (for example, KgNB) used for signaling transmission performed between the terminal device and the master node MN by using a first SRB. There are a plurality of specific implementations. In a possible implementation, the RRC reconfiguration message may include indication information, and the indication information is used to indicate that the key used for signaling transmission performed between the terminal device and the first secondary node by using the second SRB is the first key. In another possible implementation, the RRC reconfiguration message may include an sk-counter value, and the sk-counter value is a preset value (for example, the sk-counter value is infinite or infinitesimal, or another special value (for example, the special value is not within a value range, of an sk-counter value, defined in an existing protocol), and this is not limited). When the sk-counter value is the preset value, it may be implicitly indicated that the key used for signaling transmission performed between the terminal device and the first secondary node by using the second SRB is the first key. In another possible implementation, the RRC reconfiguration message may include indication information and an sk-counter value. In another possible implementation, the RRC reconfiguration message does not include an sk-counter value. It may be implicitly indicated that the key used for signaling transmission performed between the terminal device and the secondary node by using the second SRB is the first key.

Optionally, before step 1001, the master node MN may further send information about the first key to the terminal device, and the terminal device may derive, based on the information about the first key, the first key (for example, KgNB) used for signaling transmission performed between the terminal device and the master node MN by using the first SRB.

Step 1005: The terminal device determines, based on the RRC reconfiguration message, that the key used for signaling transmission performed between the terminal device and the first secondary node by using the second SRB is the first key.

A specific implementation in which the terminal device determines, based on the RRC reconfiguration message, that the key used for signaling transmission performed between the terminal device and the first secondary node by using the second SRB is the first key corresponds to step 940. For details, refer to the description in step 940. Details are not described herein again.

Step 1006: The terminal device sends an RRC message to the master node MN, where the RRC message is used to indicate that secondary node handover/change reconfiguration has been completed. Optionally, the RRC message is an RRC reconfiguration complete message.

Step 1007: The master node MN sends a fourth acknowledgement message to the second secondary node, where the fourth acknowledgement message is used to determine whether the secondary node is changed. For example, the fourth acknowledgement message is a secondary node change acknowledgement message.

Step 1008: The master node MN sends a third message to the first secondary node, where the third message is used to indicate that the terminal device has completed a secondary node handover/change process. Optionally, the third message is a secondary node reconfiguration complete message.

In a handover process, after a source base station sends a handover message to the terminal device, data transmission between the terminal device and the source base station is interrupted until the terminal device is successfully handed over to a target base station, and the terminal device may perform data transmission with the target base station. In other words, data transmission is resumed only after the terminal device is successfully handed over. In order to implement a performance of a 0 ms mobility interruption delay, a handover scheme based on a DC architecture is provided.

During a handover process based on the DC architecture, if link quality of a source cell is good, secondary node addition is performed and a target base station is added as a secondary node SN. Both the target base station (namely, the secondary node SN) and a source base station (namely, a master node MN) provide data transmission services for a terminal device. When the link quality of the source cell (namely, a cell belonging to the MN before handover) deteriorates and link quality of a target cell (namely, a cell belonging to the SN before handover) improves, the source base station may make a handover/role exchange decision. That is, the MN (namely, the source base station) before handover may be changed into an SN after handover, and the SN (namely, the target base station) before handover may be changed into an MN after handover.

In the foregoing handover process based on the DC architecture, before handover, the source base station serves as the MN, and a key used by the source base station is KgNB; the target base station serves as the SN, and a key used by the target base station is S-KgNB (S-KgNB is determined based on KgNB and an sk-counter value). After handover, the target base station to which the handover is performed is changed to the MN, and the source base station before handover is changed to the SN. In this case, the key used by the target base station (namely, the SN before handover) to which the handover is performed is S-KgNB. If a current round of handover process occurs, assuming that the foregoing handover solution based on the DC architecture is still used, a source base station (where a target base station to which handover is performed in a previous round of handover process is used as the source base station in the current round of handover process) needs to derive, based on a key (S-KgNB) and an sk-counter value of the source base station, a key of a target base station serving as a secondary node SN in the current round of handover process. Therefore, in the handover solution based on the DC architecture, the key of the target base station (the target base station to which handover needs to be performed is always first added as the secondary node SN) to which handover is performed is always determined based on the sk-counter value. This is not secure.

It may be understood that the terminal device or the network device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

According to the technical solutions provided in this embodiment of this application, in the handover solution based on the DC architecture, the key corresponding to the target base station added as the secondary node SN before handover (role exchange) may be determined based on a plurality of pieces of information. This avoids a problem of low security caused by determining the key based on the sk-counter value in each round of handover process. The following describes in detail the technical solutions provided in the embodiments of this application with reference to FIG. 11.

Figure 11:
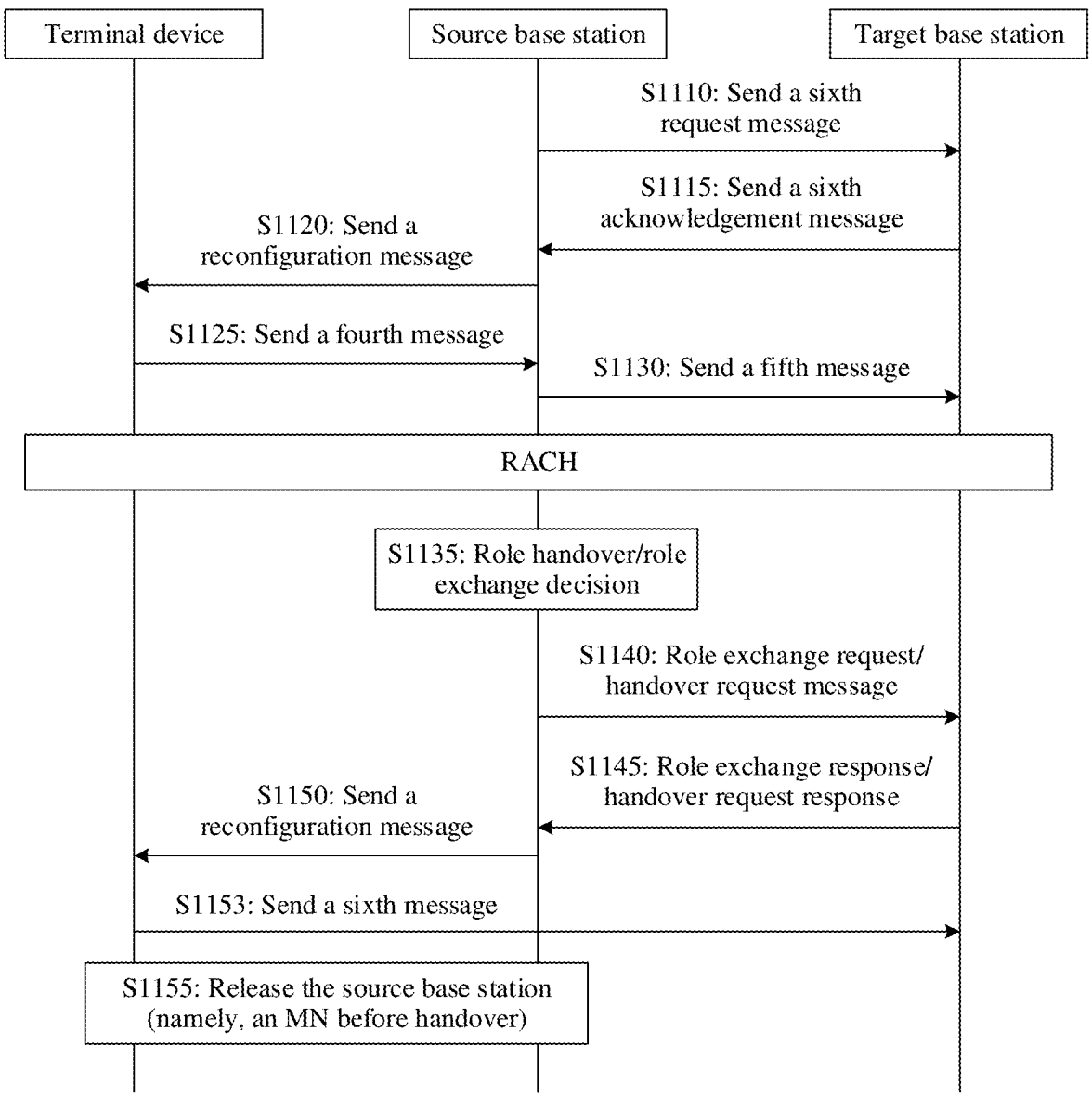
FIG. 11 is a schematic flowchart of implementing 0 ms handover based on a DC architecture according to an embodiment of this application.

FIG. 11 is a schematic flowchart of implementing a 0 ms handover interruption delay based on a DC architecture according to an embodiment of this application. As shown in FIG. 11, the method may include steps 1110 to 1155. The following separately describes steps 1110 to 1155 in detail. It should be noted that the example in FIG. 11 is merely intended to help a person skilled in the art understand the embodiments of this application, and is not intended to limit the embodiments of this application to a specific value or a specific scenario of the example. A person skilled in the art can definitely make various equivalent modifications or changes based on the example shown in FIG. 11, and such modifications and changes also fall within the scope of the embodiments of this application.

Step 1110: A source base station sends a sixth request message to a target base station, where the sixth request message is used to request to add the target base station as a secondary node. For example, the sixth request message may be a secondary node addition request message.

For example, the source base station serving as a master node MN before handover may send the secondary node addition request message to the target base station, where the secondary node addition request message is used to indicate to add the target base station as a secondary node SN.

The source base station (the MN before handover) may determine a key (for example, an S-KgNB) used by the target base station (the SN before handover), and may send the key (for example, S-KgNB) used by the target base station to the target base station (the SN before handover). As an example rather than a limitation, the source base station may include the key (for example, S-KgNB) of the target base station (the SN before handover) in the secondary node addition request message, and send the secondary node addition request message to the target base station.

Before step 1110, the source base station may receive a first next hop chaining counter (next hop chaining counter, NCC) from a core network device, for example, an access and mobility management function (access and mobility management function, AMF).

In a possible implementation, the first NCC is different from a second NCC. The source base station (the MN before handover) may determine, based on the first NCC, a next hop (next hop, NH) corresponding to the first NCC. The key S-KgNB used by the target base station (the SN before handover) is derived according to the NH corresponding to the first NCC and information about a target cell to which handover is to be performed.

It should be understood that the second NCC may be a value last used by a terminal device before the terminal device receives the first NCC.

It should be further understood that there is a mapping relationship between an NCC and an NH, and the source base station (the MN before handover) may determine, based on the first NCC and the mapping relationship, the NH corresponding to the first NCC, where the mapping relationship represents a correspondence between the first NCC and the NH.

Specifically, the source base station (the MN before handover) may derive the key S-KgNB used by the target base station (the SN before handover), based on at least one of the following: the NH corresponding to the first NCC, a physical cell identifier (physical cell identifier, PCI) of the target cell, and frequency information of the target cell.

In another possible implementation, the first NCC is the same as a second NCC. There are a plurality of implementations in which the source base station (the MN before handover) derives the key used by the target base station (the SN before handover). This is not specifically limited in this embodiment of this application. In an example, the source base station may derive, based on a key KgNB used by the source base station and information about a target cell to which handover is to be performed, the key S-KgNB corresponding to the target base station. In another example, the source base station may alternatively derive, based on a key KgNB used by the source base station and an sk-counter value, the key S-KgNB corresponding to the target base station.

For example, the source base station (the MN before handover) may derive, based on the key KgNB used by the source base station and information about a target cell to which handover is to be performed, the key S-KgNB used by the target base station (the SN before handover). The source base station carries the key S-KgNB used by the target base station (the SN before handover) in the secondary node addition request message, and sends the secondary node addition request message to the target base station.

Specifically, the source base station (the MN before handover) may derive the key S-KgNB used by the target base station (the SN before handover), based on at least one of the following: the key KgNB used by the source base station, a physical cell identifier (physical cell identifier, PCI) of the target cell, and frequency information of the target cell. The frequency information of the target cell may include a frequency corresponding to the target cell. As an example instead of a limitation, the frequency information may include a frequency of a synchronization signal block (synchronization signal block, SSB), for example, an absolute frequency (absolute frequency SSB) of the SSB and/or an absolute frequency location (for example, absolute frequency pointA) of a reference resource module. This application is not limited thereto. For specific content included in the frequency information, refer to description of a FrequencyInfoDL information element in the protocol TS38.331-f51. Details are not described herein.

For another example, the source base station (the MN before handover) may derive, based on the key KgNB of the source base station and the sk-counter value, the key S-KgNB used by the target base station, carries the key S-KgNB used by the target base station (the SN before handover) in the secondary node addition request message, and sends the secondary node addition request message to the target base station.

Step 1115: The target base station sends a sixth acknowledgement message to the source base station, where the sixth acknowledgement message is used to indicate that the secondary node SN has admitted/allowed the secondary node addition request message. Optionally, the sixth acknowledgement message may be, for example, an SN addition request ACK message.

After receiving the secondary node addition request message sent by the source base station, the target base station may perform corresponding secondary node configuration. After completing the secondary node configuration, the target base station returns a secondary node addition request acknowledgement message to the source base station.

Step 1120: The source base station sends a reconfiguration message to the terminal device, where the reconfiguration message is used to indicate the terminal device to perform secondary node addition. Optionally, the reconfiguration message is an RRC reconfiguration message.

For example, after receiving the SN addition request acknowledgement message, the source base station sends, to the terminal device, the RRC reconfiguration message that carries a secondary cell group configuration information element, to indicate the terminal device to perform secondary node addition.

The source base station may further indicate the security key S-KgNB of the target base station (the SN before handover) to the terminal device by using the RRC reconfiguration message. There are a plurality of specific implementations of the indication. This is not specifically limited in this application.

In the embodiment in which the first NCC is different from the second NCC, in an example, the RRC reconfiguration message may include the first NCC, and the terminal device may compare an NCC (namely, the second NCC) that is last used by the terminal device before the terminal device receives the first NCC with the first NCC. If the first NCC is different from the second NCC, the terminal device may derive the key S-KgNB used by the target base station (the SN before handover), based on at least one of the following: the NH corresponding to the first NCC, the physical cell identifier PCI of the target cell, and the frequency information of the target cell. In another example, the RRC reconfiguration message may include first indication information and the first NCC, and the first indication information is used to indicate that the first NCC is different from the second NCC. The terminal device may derive the key S-KgNB used by the target base station (the SN before handover), based on the first indication information by using at least one of the following: the NH corresponding to the first NCC, the physical cell identifier PCI of the target cell, and the frequency information of the target cell.

It should be understood that the second NCC is an NCC last used by the terminal device before the terminal device receives the RRC reconfiguration message, or may be understood as an NCC last used by the terminal device in a communication process with the source base station.

In the embodiment in which the first NCC is the same as the second NCC, an example is used in which the source base station derives, based on the key KgNB used by the source base station and the information about the target cell to which the handover is to be performed, the key S-KgNB corresponding to the target base station. In an example, the RRC reconfiguration message may include second indication information, and the second indication information is used to indicate the terminal device to derive, based on the key KgNB of the source base station (the MN before handover) and the information about the target cell to which the handover is to be performed, the key S-KgNB corresponding to the target base station. For example, the second indication information is used to indicate the terminal device to derive the key S-KgNB used by the target base station (the SN before handover), based on at least one of the following: the key KgNB of the source base station (the MN before handover), the physical cell identifier PCI of the target cell, and the frequency information of the target cell. In another example, the RRC reconfiguration message may include the first NCC, and the terminal device may compare an NCC (namely, the second NCC) that is last used by the terminal device before the terminal device receives the first NCC with the first NCC. If the first NCC is the same as the second NCC, the terminal device may derive the key S-KgNB corresponding to the target base station based on the key KgNB corresponding to the source base station (the MN before handover) and the information about the target cell to which the handover is to be performed. For example, the terminal device may derive the key S-KgNB used by the target base station (the SN before handover), based on at least one of the following: the key KgNB of the source base station (the MN before handover), the physical cell identifier PCI of the target cell, and the frequency information of the target cell.

In the embodiment in which the first NCC is the same as the second NCC, an example is used in which the source base station derives, based on the key KgNB used by the source base station and the sk-counter value, the key S-KgNB corresponding to the target base station. In an example, the RRC reconfiguration message includes the sk-counter value, and the terminal device may determine, based on the sk-counter value included in the RRC reconfiguration message, to derive the key S-KgNB corresponding to the target base station, based on the key KgNB used by the terminal device and the sk-counter value. In another example, the RRC reconfiguration message may include the sk-counter value and third indication information. The third indication information is used to indicate the terminal device to derive, based on the key KgNB of the source base station (the MN before handover) and the sk-counter value that is in the RRC reconfiguration message, the key S-KgNB used by the target base station. In another example, the RRC reconfiguration message may include the sk-counter value and the first NCC, and the terminal device may compare an NCC (namely, the second NCC) that is last used by the terminal device before the terminal device receives the first NCC with the first NCC. If the first NCC is the same as the second NCC, the terminal device may derive, based on the key KgNB of the source base station (the MN before handover) and the sk-counter value in the RRC reconfiguration message, the key S-KgNB used by the target base station.

Step 1125: The terminal device sends a fourth message to the source base station (the MN before handover), where the fourth message is used to indicate that RRC reconfiguration is completed. Optionally, the fourth message is an RRC reconfiguration complete message.

Step 1130: The source base station (the MN before handover) sends a fifth message to the target base station (the SN before handover), where the fifth message is used to indicate that the terminal device has completed a reconfiguration process. Optionally, the fifth message is a secondary node reconfiguration complete message.

The terminal device performs an RACH process with the target base station (the SN before handover).

According to the foregoing steps, the target base station is configured as the secondary node in the DC architecture, and the terminal device may perform data transmission with the source base station (the MN before handover) and the target base station (the SN before handover).

Step 1135: The source base station (the MN before handover) makes a handover/role exchange decision.

After secondary node SN addition is completed, the terminal device may perform data transmission with the source base station (the MN before handover) and the target base station (the SN before handover). When link quality of a source cell (namely, a serving cell belonging to the MN before handover) deteriorates and link quality of the target cell (namely, a serving cell belonging to the SN before handover) improves, the source base station may make the role exchange/handover decision, for example, the source base station may make the role exchange/handover decision based on a measurement report reported by the terminal device. That is, the MN before handover may be changed into an SN after handover, and the SN before handover may be changed into an MN after handover.

Step 1140: The source base station (namely, the MN before handover) sends a role exchange request/handover request to the target base station (namely, the SN before handover).

For example, the role exchange/handover request may be sent by using an existing message such as a handover request message, or may be sent by using a newly introduced message. This is not limited in this application.

Step 1145: The target base station (namely, the SN before handover) sends a role exchange response/handover request response to the source base station (namely, the MN before handover).

For example, the role exchange response/handover request response may be sent by using an existing message such as a handover request acknowledgement message, or may be sent by using a newly introduced message. This is not limited.

Step 1150: The source base station (namely, the MN before handover) sends a reconfiguration message to the terminal device, where the reconfiguration message is used to indicate the terminal device to perform role exchange/handover. Optionally, the reconfiguration message is an RRC reconfiguration message.

For example, the RRC reconfiguration message is used to indicate the terminal device to perform role exchange/handover, to be specific, indicate the terminal device to change the source base station (namely, the MN before handover) to the SN through the handover, and change the target base station (namely, the SN before handover) to the MN through the handover.

Specifically, in an NR system, the RRC reconfiguration message may be an RRC reconfiguration message that carries a reconfiguration with sync information element. In an LTE system, the RRC reconfiguration message may be an RRC connection reconfiguration message that carries a mobility control info information element.

It should be noted that, in a first possible implementation, the source base station (namely, the MN before handover) may send two RRC reconfiguration messages to the terminal device, for example, the RRC reconfiguration message that carries the secondary cell group configuration information element in step 1120 and the RRC reconfiguration message that carries the reconfiguration with sync information element in step 1150. In other words, in a first manner, secondary node addition and role exchange/handover are completed separately. Correspondingly, secondary node addition may be performed between the source base station and the target base station by using steps 1110 and 1115, and role exchange preparation/handover preparation may be performed by using steps 1140 and 1145.

Alternatively, in a second possible implementation, the source base station (namely, the MN before handover) may send only one RRC reconfiguration message to the terminal device. The NR system is used as an example, and the RRC reconfiguration message carries a secondary cell group configuration information element and the reconfiguration with sync information element. The terminal device may perform a secondary node SN addition procedure based on the secondary cell group configuration information element carried in the RRC reconfiguration message. In addition, the terminal device may perform a role exchange/handover procedure based on the reconfiguration with sync information element carried in the RRC reconfiguration message, so that the source base station (namely, the MN before handover) is changed to the SN through handover, and the target base station (namely, the SN before handover) is changed to the MN through handover. That is, the messages in step 1120 and step 1150 may be combined into one message that is used to indicate the terminal device to perform the secondary node addition and the role exchange/handover. That is, in a second manner, secondary node addition and role exchange/handover may be performed simultaneously. Correspondingly, in the second implementation, the source base station and the target base station may send the secondary node addition request and the role exchange request/handover request by using an Xn message, and return a response to the secondary node addition request and a response to the role exchange request/handover request by using an Xn message. In other words, the messages in step 1110 and step 1140 may be combined into one message, and the secondary node addition request and the role exchange request/handover request may be sent by using the message; the messages in step 1115 and step 1145 may be combined into one message, and the response to the secondary node addition request and the response to the role exchange request/handover request are returned by using the message.

After handover is completed or the roles are exchanged, the source base station (namely, the MN before handover) is changed to the SN, and the target base station (namely, the SN before handover) is changed to the MN. After handover, the terminal device may perform data transmission with both the source base station (namely, the SN after handover) and the target base station (namely, the MN after handover).

It should be noted that, in a first possible implementation, the RRC reconfiguration message carrying the secondary cell group configuration information element may include a related parameter required for obtaining the key S-KgNB corresponding to the target base station. The specific parameter is described in step S1120. In a second possible implementation, the RRC reconfiguration message carrying the secondary cell group configuration information element and the reconfiguration with sync information element may include a related parameter required for obtaining the key S-KgNB corresponding to the target base station. The specific parameter is described in step S1120.

Step 1153: The terminal device sends a sixth message to the target base station (namely, the MN after handover), where the sixth message is used to indicate that role exchange/handover is completed. Optionally, the sixth message is an RRC reconfiguration complete message.

Step 1155: Release the source base station (namely, the MN before handover).

When link quality of the source base station (namely, the MN before handover and the SN after handover) deteriorates, the source base station (namely, the MN before handover and the SN after handover) may be released by using a secondary node (namely, the source base station that is changed to the SN after the role exchange/handover is completed) release procedure.

It may be understood that the terminal device or the network device may perform some or all of the steps in the foregoing embodiments. The steps or operations are merely examples. In the embodiments of this application, other operations or variations of various operations may be further performed. In addition, the steps may be performed in sequences different from the sequences presented in the foregoing embodiments, and not all operations in the foregoing embodiments are necessarily to be performed.

In the foregoing technical solution, in the handover solution based on the DC architecture, the key of the secondary node SN (namely, the target base station to which the terminal device is to be handed over) is determined based on a plurality of pieces of information, to avoid a problem of low key security.

It may be understood that, in the communication method in the embodiments of this application, the steps implemented by the terminal device may alternatively be implemented by a component (for example, a chip or a circuit) that can be used in the terminal device. The steps implemented by the network device may alternatively be implemented by a component (for example, a chip or a circuit) that can be used in the network device.

The foregoing describes in detail the communication methods provided in the embodiments of this application with reference to FIG. 1 to FIG. 11. The following describes in detail apparatus embodiments of this application with reference to FIG. 12 to FIG. 19. It should be understood that, description of the method embodiments corresponds to description of the apparatus embodiments. Therefore, for a part not described in detail, refer to the foregoing method embodiments.

Figure 12:
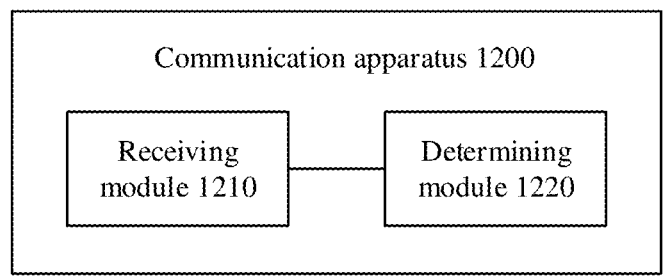
FIG. 12 is a schematic block diagram of a communication apparatus 1200 according to an embodiment of this application.

FIG. 12 is a schematic block diagram of a communication apparatus 1200 according to an embodiment of this application. It may be understood that the communication apparatus 1200 may be a terminal device, or may be a component that can be used in the terminal device. The component may include a chip used in the terminal device.

The communication apparatus 1200 may include a receiving module 1210 and a determining module 1220.

The receiving module 1210 is configured to receive indication information from a master node, where the indication information is used to indicate that a key used for signaling transmission performed between the terminal device and a first secondary node by using a second signaling radio bearer SRB is a first key, the first key is a key used for signaling transmission performed between the terminal device and the master node by using a first SRB, and the first secondary node and the master node share one central unit CU.

The determining module 1220 is configured to determine, based on the indication information, that the key used for signaling transmission performed between the terminal device and the first secondary node by using the second SRB is the first key.

Optionally, the indication information is carried in a radio resource control RRC reconfiguration message, and the RRC reconfiguration message is used to indicate the terminal device to add the first secondary node, or used to indicate the terminal device to be handed over from a second secondary node to the first secondary node.

Optionally, the first SRB is SRB1 or SRB2, and the second SRB is SRB3.

Optionally, the RRC reconfiguration message further includes a first value. The determining module 1020 is specifically configured to: when the first value is a preset value, determine, based on the first value, that the key used for signaling transmission performed between the terminal device and the first secondary node by using the second SRB is the first key.

Optionally, the first value is an sk-counter value.

Figure 13:
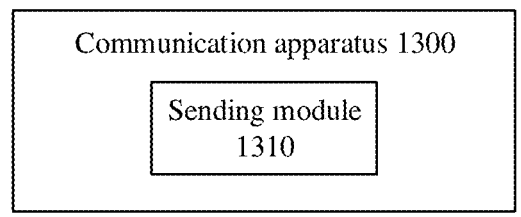
FIG. 13 is a schematic block diagram of a communication apparatus 1300 according to an embodiment of this application.

FIG. 13 is a schematic block diagram of a communication apparatus 1300 according to an embodiment of this application. It may be understood that the communication apparatus 1300 may be a master node, or may be a component that can be used in the master node. The component may include a CU, a chip used in the CU, a DU, a chip used in the DU, or a chip used in the master node.

The communication apparatus 1300 may include a sending module 1310, configured to send indication information to a terminal device, where the indication information is used to indicate that a key used for signaling transmission performed between the terminal device and a first secondary node by using a second signaling radio bearer SRB is a first key, the first key is a key used for signaling transmission performed between the terminal device and the master node by using a first SRB, and the first secondary node and the master node share one central unit CU.

Optionally, the indication information is carried in a radio resource control RRC reconfiguration message, and the RRC reconfiguration message is used to indicate the terminal device to add the first secondary node, or used to indicate the terminal device to be handed over from a second secondary node to the first secondary node.

Optionally, the first SRB is SRB1 or SRB2, and the second SRB is SRB3.

Optionally, the RRC reconfiguration message further includes a first value. When the first value is a preset value, the first value is used to indicate that the key used for signaling transmission performed between the terminal device and the first secondary node by using the second SRB is the first key.

Optionally, the first value is an sk-counter value.

Figure 14:
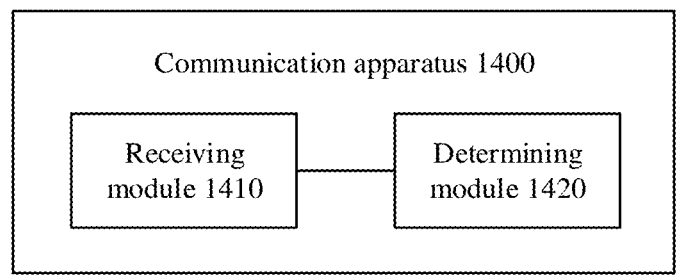
FIG. 14 is a schematic block diagram of a communication apparatus 1400 according to an embodiment of this application.

FIG. 14 is a schematic block diagram of a communication apparatus 1400 according to an embodiment of this application. It may be understood that the communication apparatus 1400 may be a terminal device, or may be a component that can be used in the terminal device. The component may include a chip used in the terminal device.

The communication apparatus 1400 may include a receiving module 1410 and a determining module 1420.

The receiving module 1410 is configured to receive a radio resource control RRC reconfiguration message from a source network device, where the RRC reconfiguration message is used to indicate the terminal device to add, as a secondary node SN, a network device to which a target cell to which handover needs to be performed belongs.

The determining module 1420 is configured to determine a second key based on the RRC reconfiguration message by using one or more of the following information: a first key used for transmission between the terminal device and the source network device, information about the target cell, and a next-hop NH corresponding to a next hop chaining counter NCC, where the second key is a key used for transmission between the terminal device and the target network device, the information about the target cell includes frequency information of the target cell and/or a physical cell identifier of the target cell, the target cell belongs to the target network device, the source network device is a master node MN before handover and is a secondary node SN after handover, and the target network device is a secondary node SN before handover and is a master node MN after handover.

Optionally, the RRC reconfiguration message includes a first NCC.

Optionally, the determining module 1420 is specifically configured to determine the second key based on an NH corresponding to the first NCC and the information about the target cell, where a second NCC is a value last used by the terminal device before the terminal device receives the RRC reconfiguration message, and the first NCC is different from the second NCC.

Optionally, the determining module 1420 is further configured to determine that the first NCC is different from the second NCC. The terminal device determines the second key based on distinctness between the first NCC and the second NCC by using the NH corresponding to the first NCC and the information about the target cell.

Optionally, the determining module 1420 is specifically configured to determine the second key based on the first key and the information about the target cell, where the first NCC is the same as a second NCC.

Optionally, the determining module 1420 is further configured to determine that the first NCC is the same as the second NCC. The terminal device determines the second key based on sameness between the first NCC and the second NCC by using the first key and the information about the target cell.

Optionally, the RRC reconfiguration message includes first indication information, and the first indication information is used to indicate that the first NCC is different from the second NCC. The determining module 1420 is specifically configured to determine the second key based on the first indication information by using the NH corresponding to the first NCC and the information about the target cell.

Optionally, the RRC reconfiguration message includes second indication information, and the second indication information is used to indicate the terminal device to determine the second key by using the first key and the information about the target cell. The determining module 1420 is specifically configured to determine the second key based on the second indication information by using the first key and the information about the target cell.

Optionally, the RRC reconfiguration message includes a first value.

Optionally, the RRC reconfiguration message further includes a first value and a first NCC, and the determining module 1420 is specifically configured to determine the second key based on the first value and the first key, where the first NCC is the same as a second NCC.

Optionally, the determining module 1420 is further configured to: determine that the first NCC is the same as the second NCC; and determine, by using the first value and the first key, the second key based on sameness between the first NCC and the second NCC and the first value that is included in the RRC reconfiguration message.

Optionally, the RRC reconfiguration message further includes a first value and third indication information, and the third indication information is used to indicate to determine the second key based on the first value and the first key. The determining module 1420 is specifically configured to determine, by using the first value and the first key, the second key based on the third indication information and the first value that is included in the RRC reconfiguration message.

Optionally, the RRC reconfiguration message is further used to indicate the terminal device to perform handover. After handover is completed, the source network device becomes an SN, and the target network device becomes an MN.

Optionally, the first value is an sk-counter value.

Figure 15:
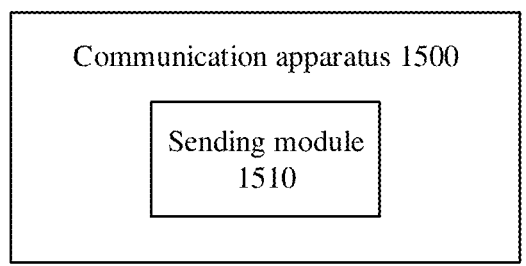
FIG. 15 is a schematic block diagram of a communication apparatus 1500 according to an embodiment of this application.

FIG. 15 is a schematic block diagram of a communication apparatus 1500 according to an embodiment of this application. It may be understood that the communication apparatus 1500 may be a source network device, or may be a component applicable to the source network device. The component may include a CU, a chip used in the CU, a DU, a chip used in the DU, or a chip used in the source network device.

The communication apparatus 1500 may include a sending module 1510, configured to send a radio resource control RRC reconfiguration message to a terminal device, where the RRC reconfiguration message is used to indicate the terminal device to add, as a secondary node SN, a network device to which a target cell to which handover needs to be performed belongs, where the source network device is a master node MN before the terminal device is handed over and is a secondary node SN after handover, and the target network device is a secondary node SN before handover and is a master node MN after handover.

Optionally, the communication apparatus 1500 further includes: a determining module 1520, configured to determine a second key by using one or more of the following information: a first key used for transmission between the terminal device and the source network device, information about the target cell, and a next-hop NH corresponding to a next hop chaining counter NCC, where the second key is a key used for transmission between the terminal device and the target network device, the information about the target cell includes frequency information of the target cell and/or a physical cell identifier of the target cell, the target cell belongs to the target network device, and the target network device is a network device to which the terminal device needs to be handed over. The source network device sends the second key to the target network device.

The sending module 1510 is further configured to send the second key to the target network device.

Optionally, the determining module 1520 is specifically configured to determine the second key based on an NH corresponding to a first NCC and the information about the target cell, where a second NCC is a value last used by the terminal device before the terminal device sends the RRC reconfiguration message, and the first NCC is different from the second NCC.

Optionally, the determining module 1520 is specifically configured to determine the second key based on the first key and the information about the target cell, where the first NCC is the same as the second NCC.

Optionally, the determining module 1520 is specifically configured to determine the second key based on a first value and the first key, where the first NCC is the same as the second NCC.

Optionally, the first value is an sk-counter value.

Figure 16:
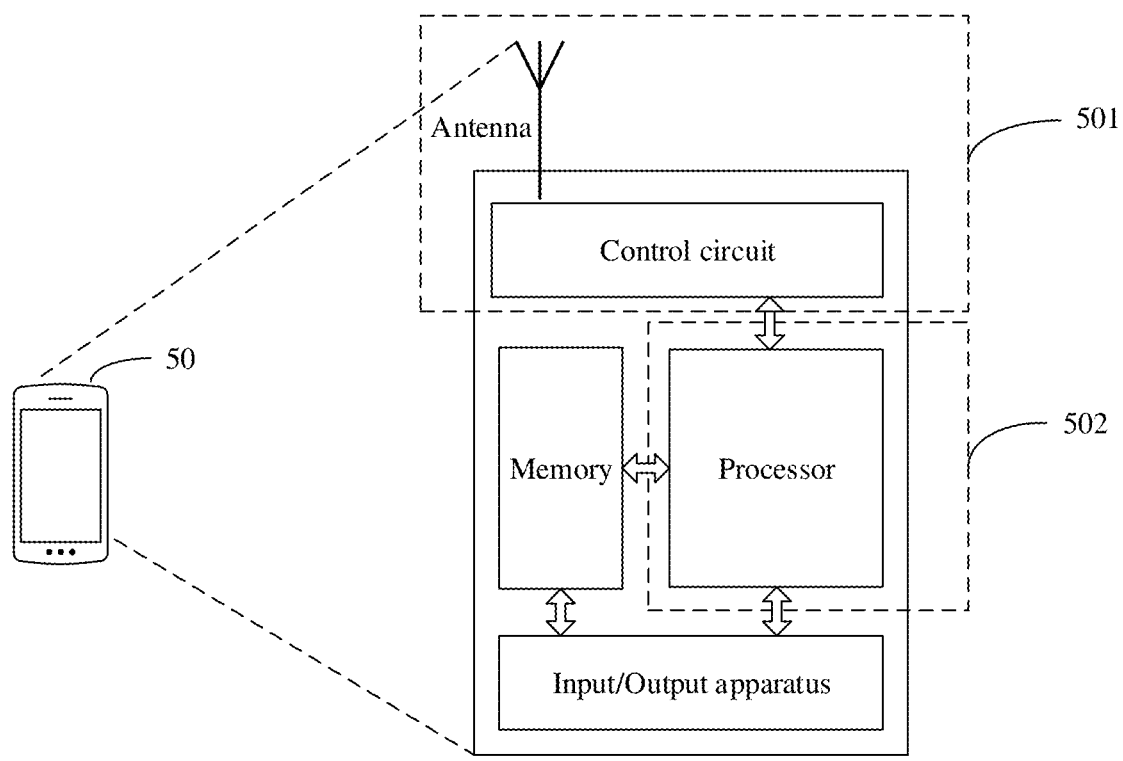
FIG. 16 is a schematic diagram of a structure of a terminal device 50 according to an embodiment of this application.

FIG. 16 is a schematic diagram of a structure of a terminal device 50 according to an embodiment of this application. The terminal device 50 is applicable to the system shown in one or more in FIG. 1, FIG. 2, or FIG. 7(a), to perform functions of the terminal device in the foregoing method embodiments. For ease of description, FIG. 16 shows only main components of the terminal device 50. As shown in FIG. 16, the terminal device 50 includes a processor, a memory, a control circuit, an antenna, and an input/output apparatus. The processor is mainly configured to: process a communication protocol and communication data, control the entire terminal device 50, execute a software program, and process data of the software program, for example, configured to support the terminal device 50 in performing the actions described in the foregoing method embodiments. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, for example, a touchscreen, a display, or a keyboard, is mainly configured to: receive data entered by a user and output data to the user.

After the terminal device 50 is powered on, the processor may read the software program in the memory, explain and execute instructions of the software program, and process data of the software program. When data needs to be sent in a wireless manner, after the processor performs baseband processing on the to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is sent to the terminal device 50, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 16 shows only one memory and only one processor. In an actual terminal device 50, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

In an optional implementation, the terminal device 50 may include a baseband processor and a central processing unit. The baseband processor is mainly configured to process the communication protocol and the communication data.

The central processing unit is mainly configured to control the entire terminal device, execute the software program, and process the data of the software program. The processor in FIG. 16 may integrate functions of the baseband processor and the central processing unit. A person skilled in the art may understand that, alternatively, the baseband processor and the central processing unit may be independent processors, and interconnected by using a technology such as a bus. A person skilled in the art can understand that the terminal device 50 may include a plurality of baseband processors to adapt to different network standards, the terminal device 50 may include a plurality of central processing units to enhance a processing capability of the terminal device 50, and components of the terminal device 50 may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

In this embodiment of this application, the control circuit and the antenna having a transceiver function may be considered as a transceiver unit 501 of the terminal device 50. For example, the transceiver unit is configured to support the terminal device 50 in performing a receiving function and a sending function. A processor 502 having a processing function is considered as a processing unit 502 of the terminal device 50. As shown in FIG. 16, the terminal device 50 includes the transceiver unit 501 and the processing unit 502. The transceiver unit may also be referred to as a transceiver, a transceiver machine, a transceiver apparatus, or the like. Optionally, a component configured to implement the receiving function in the transceiver unit 501 may be considered as a receiving unit, and a component configured to implement the sending function in the transceiver unit 501 may be considered as a sending unit. That is, the transceiver unit 501 includes the receiving unit and the sending unit. The receiving unit may also be referred to as a receiver, an input port, a receiver circuit, or the like. The sending unit may be referred to as a transmitter, a transmitter machine, a transmitter circuit, or the like.

The processor 502 may be configured to execute instructions stored in the memory, to control the transceiver unit 501 to receive a signal and/or send a signal, to complete a function of the terminal device in the foregoing method embodiments. The processor 502 further includes an interface, configured to implement a signal input/output function. In an implementation, it may be considered that the functions of the transceiver unit 501 are implemented by using a transceiver circuit or a transceiver-dedicated chip.

Figure 17:
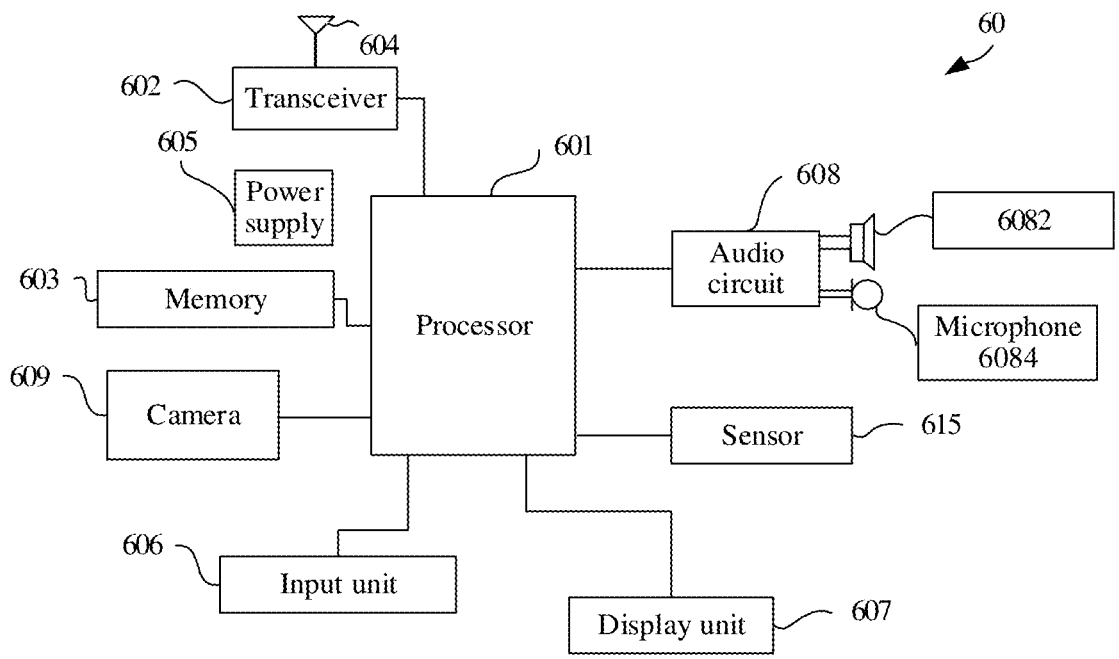
FIG. 17 is another schematic diagram of a structure of a terminal device 60 according to an embodiment of this application.

FIG. 17 is another schematic diagram of a structure of a terminal device 60 according to an embodiment of this application. As shown in FIG. 17, the terminal device 60 includes a processor 601 and a transceiver 602. Optionally, the terminal device 600 further includes a memory 603. The processor 601, the transceiver 602, and the memory 603 communicate with each other by using an internal connection path, to transfer a control signal and/or a data signal. The memory 603 is configured to store a computer program. The processor 601 is configured to invoke the computer program from the memory 603 and run the computer program, to control the transceiver 602 to receive/send a signal. The terminal device 600 may further include an antenna 604 that is configured to send, by using a radio signal, uplink data or uplink control signaling output by the transceiver 602.

The processor 601 and the memory 603 may be integrated into one processing apparatus. The processor 601 is configured to execute program code stored in the memory 603, to implement the foregoing functions. During specific implementation, the memory 603 may alternatively be integrated into the processor 601, or may be independent of the processor 601.

Specifically, the terminal device 60 may correspond to the terminal device in the embodiments of the methods according to the embodiments of this application. In addition, units in the terminal device 60 and the foregoing other operations and/or functions are used to implement corresponding procedures in the embodiments of the methods.

The processor 601 may be configured to perform an action implemented by the terminal device in the foregoing method embodiments, and the transceiver 602 may be configured to perform a sending action or a receiving action implemented by the terminal device in the foregoing method embodiments. For details, refer to the description in the foregoing method embodiments. Details are not described herein again.

Optionally, the terminal device 60 may further include a power supply 605, configured to supply power to various devices or circuits in the terminal device.

In addition, to implement more complete functions of the terminal device, the terminal device 60 may further include one or more of an input unit 606, a display unit 607, an audio circuit 608, a camera 609, a sensor 66, and the like, and the audio circuit may further include a speaker 6082, a microphone 6084, and the like.

Figure 18:
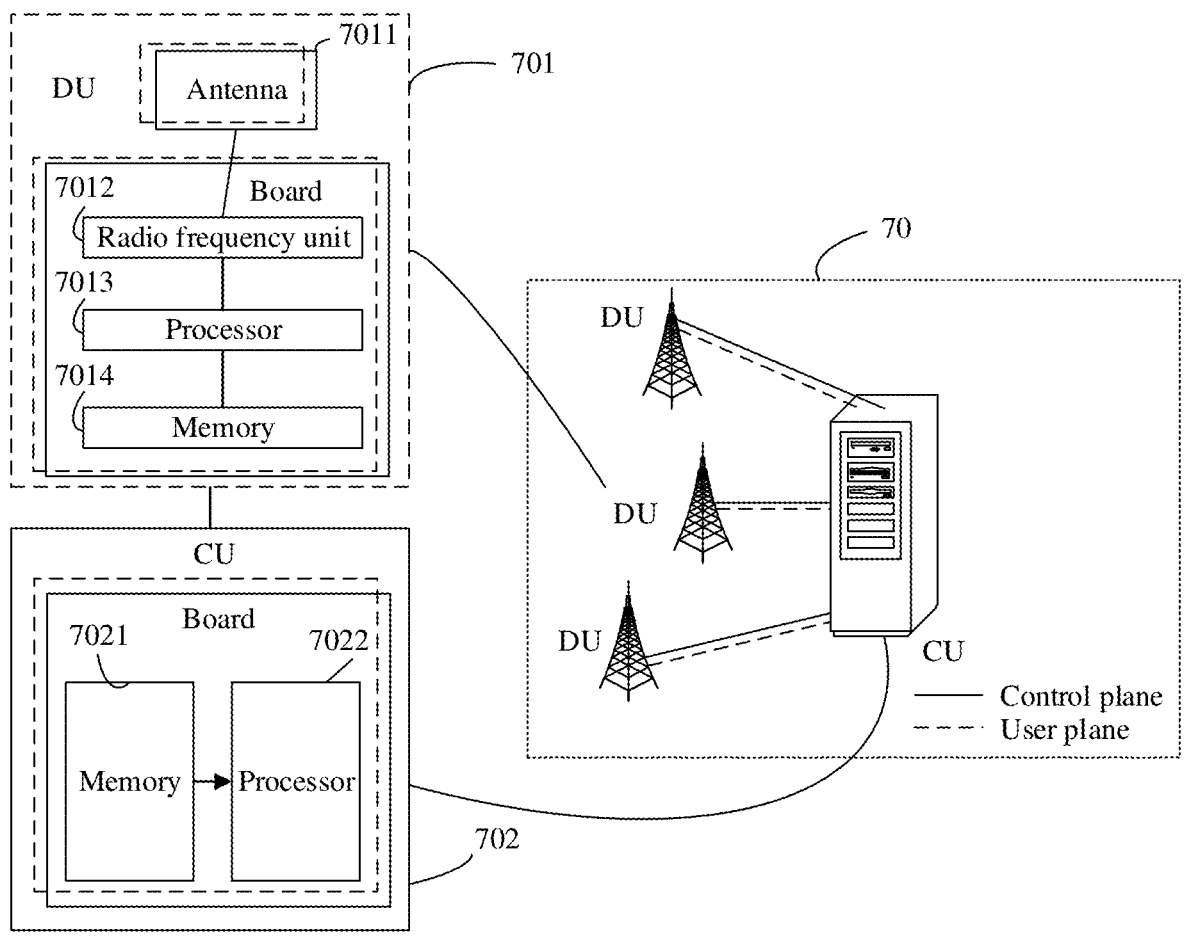
FIG. 18 is a schematic diagram of a structure of a network device according to an embodiment of this application.

FIG. 18 is a schematic diagram of a structure of a network device according to an embodiment of this application, for example, may be a schematic diagram of a structure of a base station. As shown in FIG. 18, the base station may be used in the system shown in one or more of FIG. 1 to FIG. 7(*a*) and FIG. 7(*b*), to perform a function performed by the master node or a component used in the master node, or the source network device or a component used in the source network device in the foregoing method embodiments. The base station 70 may include one or more DUs 701 and one or more CUs 702. The CU 702 may communicate with an NG core (next generation core, NC). The DU 701 may include at least one radio frequency unit 7012, at least one processor 7013, and at least one memory 7014. The DU 701 may further include at least one antenna 7011. The DU 701 is mainly configured to receive and send a radio frequency signal, convert a radio frequency signal and a baseband signal, and perform some baseband processing. The CU 702 may include at least one processor 7022 and at least one memory 7021. The CU 702 and the DU 701 may communicate by using an interface. A control plane (control plane) interface may be an Fs-C, for example, F1-C, and a user plane (user plane) interface may be an Fs-U, for example, F1-U.

The CU 702 is mainly configured to perform baseband processing, control the base station, and the like. The DU 701 and the CU 702 may be physically disposed together, or may be physically disposed separately, in other words, may be a distributed base station. The CU 702 is a control center of the base station, may also be referred to as a processing unit, and is mainly configured to complete a baseband processing function. For example, the CU 702 may be configured to control the base station to perform an operation procedure of the master node or the component used in the master node, or the source network device or the component used in the source network device in the foregoing method embodiments.

Specifically, baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP layer, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer.

In addition, optionally (not shown in the figure), the base station 70 may include one or more antennas, one or more radio frequency units, one or more DUs, and one or more CUs. The DU may include at least one processor and at least one memory, the at least one antenna and the at least one radio frequency unit may be integrated into one antenna apparatus, and the CU may include at least one processor and at least one memory.

In an example, the CU 702 may include one or more boards, and a plurality of boards may jointly support a radio access network (for example, a 5G network) of a single access standard, or may separately support radio access networks (such as an LTE network, a 5G network, or another network) of different access standards. The memory 7021 and the processor 7022 may serve one or more boards. In other words, a memory and a processor may be disposed on each board. Alternatively, a plurality of boards may share a same memory and a same processor. In addition, a necessary circuit may be further disposed on each board. The DU 701 may include one or more boards, and a plurality of boards may jointly support a radio access network (for example, a 5G network) of a single access standard, or may separately support radio access networks (such as an LTE network, a 5G network, or another network) of different access standards. The memory 7014 and the processor 7013 may serve one or more boards. In other words, a memory and a processor may be disposed on each board. Alternatively, a plurality of boards may share a same memory and a same processor. In addition, a necessary circuit may be further disposed on each board.

Figure 19:
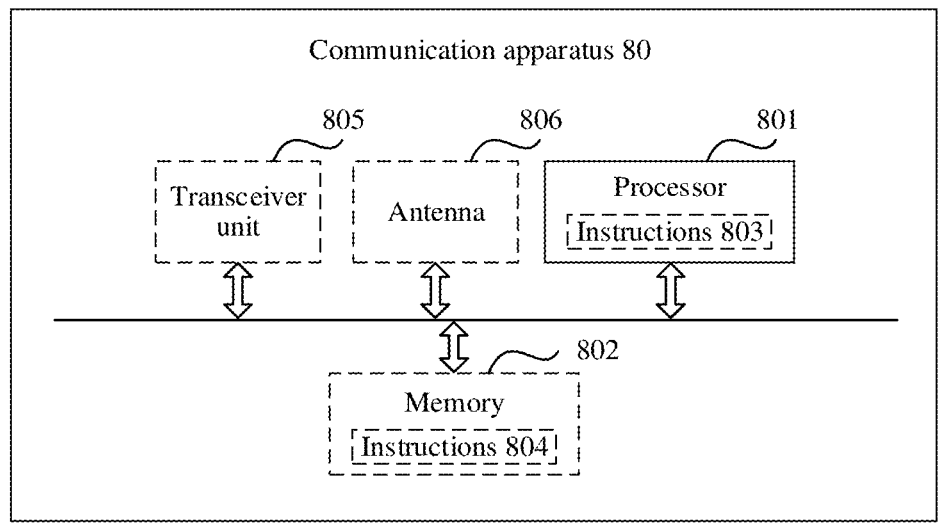
FIG. 19 is a schematic diagram of a structure of a communication apparatus 80 according to an embodiment of this application.

FIG. 19 is a schematic diagram of a structure of a communication apparatus 80 according to an embodiment of this application. The communication apparatus 80 may be configured to implement the method described in the foregoing method embodiments. Refer to the description in the foregoing method embodiments. The communication apparatus 80 may be a chip, a network device (for example, a base station), or a terminal device.

The communication apparatus 80 includes one or more processors 801. The processor 801 may be a general-purpose processor, a dedicated processor, or the like. For example, the processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program. The apparatus may include a transceiver unit configured to input (receive) and output (send) a signal. For example, the apparatus may be a chip, and the transceiver unit may be an input and/or output circuit or a communication interface of the chip. The chip may be used for the terminal device or the network device (for example, the base station). For another example, the apparatus may be the terminal device or the network device (for example, the base station), and the transceiver unit may be a transceiver, a radio frequency chip, or the like.

The communication apparatus 80 includes one or more processors 801. The one or more processors 801 may implement the methods implemented by the master node, the source network device, or the terminal device in the embodiments shown in FIG. 8, FIG. 9, FIG. 10(*a*), FIG. 10(*b*), and FIG. 11.

In a possible design, the communication apparatus 80 includes a means (means) configured to receive scheduling information from the source network device, and a means (means) configured to send sidelink data based on the scheduling information. For example, the scheduling information may be received or the sidelink data may be sent by using a transceiver, an input/output circuit, or an interface of the chip. For the scheduling information, refer to related description in the foregoing method embodiments.

In a possible design, the communication apparatus 80 includes a means (means) configured to determine scheduling information of the terminal device, and a means (means) configured to send the scheduling information to the terminal device. For details, refer to related description in the foregoing method embodiments. For example, the scheduling information may be sent by using a transceiver, an input/output circuit, or an interface of the chip, and the scheduling information of the terminal device may be determined by using one or more processors.

In a possible design, the communication apparatus 80 includes a means (means) configured to receive scheduling information from the master node, and a means (means) configured to receive sidelink data based on the scheduling information. For details, refer to related description in the foregoing method embodiments. For example, the scheduling information and the sidelink data may be received by using a transceiver, an input/output circuit, or an interface of the chip.

Optionally, in addition to implementing the methods in the embodiments shown in one or more of FIG. 8, FIG. 9, FIG. 10(*a*), FIG. 10(*b*), and FIG. 11, the processor 801 may further implement other functions.

Optionally, in a design, the processor 801 may further include instructions 803. The instructions may be run on the processor, so that the communication apparatus 80 performs the methods described in the foregoing method embodiments.

In still another possible design, the communication apparatus 80 may alternatively include a circuit. The circuit may implement a function of the master node, the component used in the master node, the source network device, the component used in the source network device, or the terminal device in the foregoing method embodiments.

In still another possible design, the communication apparatus 80 may include one or more memories 802. The memory stores instructions 804. The instructions may be run on the processor, so that the communication apparatus 80 performs the methods described in the foregoing method embodiments. Optionally, the memory may further store data. Optionally, the processor may also store instructions and/or data. For example, the one or more memories 802 may store the related parameter or the like in the foregoing embodiments. The processor and the memory may be separately disposed, or may be integrated together.

In still another possible design, the communication apparatus 80 may further include a transceiver unit 805 and an antenna 806, or include a communication interface. The transceiver unit 805 may be referred to as a transceiver machine, a transceiver circuit, a transceiver, or the like, and is configured to implement a transceiver function of the apparatus by using the antenna 806. The communication interface (not shown in the figure) may be used for communication between a core network device and the network device, or communication between network devices. Optionally, the communication interface may be a wired communication interface, for example, an optical fiber communication interface.

The processor 801 may be referred to as a processing unit, to control an apparatus (for example, the terminal or the base station).

In addition, because sending or receiving performed by the transceiver unit 805 described in this embodiment of this application is under control of the processing unit (processor 801), a sending or receiving action may also be described as being performed by the processing unit (processor 801) in this embodiment of this application. This does not affect understanding of the solution by a person skilled in the art.

The terminal device, the master node, and the source network device in the foregoing apparatus embodiments may completely correspond to the terminal device, the master node, and the source network device in the method embodiments, and corresponding modules or units perform corresponding steps. For example, when the apparatus is implemented in a form of a chip, a receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

It should be understood that, the processor in the embodiments of this application may be a CPU, or the processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like.

It may be further understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. By way of example, and not limitative description, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

An embodiment of this application further provides a communication system. The communication system includes one or more of the following:

the foregoing master node or a component used in the master node;

a source network device or a component used in the source network device; or a terminal device or a component that can be used in the terminal device.

An embodiment of this application further provides a computer-readable medium, configured to store computer program. The computer program includes instructions used to perform the method performed by the master node or a component used in the master node, a source network device or a component used in the source network device, or a terminal device or a component used in the terminal device in the foregoing methods. The readable medium may be a read-only memory (read-only memory, ROM) or a random access memory (random access memory, RAM). This is not limited in this embodiment of this application.

This application further provides a computer program product. The computer program product includes instructions. When the instructions are executed, a master node or a component used in the master node, a source network device or a component used in the source network device, or a terminal device or the component used in the terminal device respectively performs operations corresponding to the master node, the source network device, and the terminal device in the foregoing methods.

An embodiment of this application further provides a system chip. The system chip includes a processing unit and a communication unit. The processing unit may be, for example, a processor. The communication unit may be, for example, an input/output interface, a pin, or a circuit. The processing unit may execute computer instructions, so that a communication apparatus to which the chip is used performs the methods provided in the embodiments of this application.

Optionally, any communication apparatus provided in the embodiments of this application may include the system chip.

Optionally, the computer instructions are stored in a storage unit.

Optionally, the storage unit is a storage unit in the chip, for example, a register or a cache. Alternatively, the storage unit may be a storage unit that is in the communication apparatus and that is located outside the chip, for example, a ROM, another type of static storage device that can store static information and instructions, or a RAM. The processor mentioned anywhere above may be a CPU, a microprocessor, an ASIC, or one or more integrated circuits for controlling program execution of the foregoing communication method. The processing unit and the storage unit may be decoupled, separately disposed on different physical devices, and connected in a wired or wireless manner to implement respective functions of the processing unit and the storage unit, to support the system chip in implementing various functions in the foregoing embodiments. Alternatively, the processing unit and the memory may be coupled on one device. It should be understood that, in the embodiments of this application, the processor may be a CPU, or may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

A person skilled in the art may clearly understand that, for the purpose of convenient and brief description, for detailed working processes of the foregoing systems, apparatuses, and units, refer to corresponding processes in the foregoing method embodiments. Details are not described herein again.

All or some of the foregoing embodiments may be implemented by using software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

Names are assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a usage habit. Technical meanings of technical terms in this application should be understood and determined mainly based on functions and technical effects reflected/performed by the technical terms in the technical solutions.

It should be understood that the term "and/or" in this specification describes only an association relationship between associated objects and represents that three relationships may exist. For example, A and/or B may represent the following three cases: Only A exists, both A and B exist, and only B exists. A and B may be singular or plural. In addition, the character "/" in this specification usually represents an "or" relationship between the associated objects, or may represent an "and/or" relationship. A specific meaning depends on a context.

It should be understood that, in the embodiments of this application, "B corresponding to A" indicates that B is associated with A, and B may be determined based on A. However, it should be further understood that determining B based on A does not mean that B is determined based only on A. B may alternatively be determined based on A and/or other information.

In this application, "at least one" refers to one or more, and "a plurality of" refers to two or more. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in the embodiments of this application. The execution sequences of the processes should be determined based on functions and internal logic of the processes, and should not constitute any limitation on implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

In the several embodiments provided in this application, it should be understood that the disclosed systems, communication apparatuses, and methods may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other similar forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions in this application essentially, or the part contributing to a conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing description is merely specific implementations in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device comprising a processor, indication information from a master node, wherein
   the indication information is used to indicate that a key used for signaling transmission performed between the terminal device and a first secondary node by using a second signaling radio bearer (SRB) is a first key,
   the indication information is carried in a radio resource control (RRC) reconfiguration message,
   the RRC reconfiguration message is used to cause the terminal device to add the first secondary node or to be handed over from a second secondary node to the first secondary node,
   the first key is used for signaling transmission performed between the terminal device and the master node by using a first SRB, and
   the first secondary node and the master node share one central unit; and
   determining, by the terminal device, based on the indication information, that the first key is used for signaling transmission performed between the terminal device and the first secondary node by using the second SRB.

2. The communication method according to claim 1, wherein the first SRB is SRB1 or SRB2, and the second SRB is SRB3.

3. The communication method according to claim 1, wherein
   the RRC reconfiguration message comprises a first value, and
   the determining, by the terminal device, based on the indication information, that the first key is used for signaling transmission performed between the terminal device and the first secondary node by using the second SRB comprises:
      in response to the first value being a preset value, determining, by the terminal device, based on the first value, that the first key is used for signaling transmission performed between the terminal device and the first secondary node by using the second SRB.

4. The communication method according to claim 3, wherein the first value is an sk-counter value.

5. A communication method, comprising:
   sending indication information to a terminal device, wherein
   the indication information is used to indicate that a key used for signaling transmission performed between the terminal device and a first secondary node by using a second signaling radio bearer (SRB) is a first key,
   the indication information is carried in a radio resource control (RRC) reconfiguration message,
   the RRC reconfiguration message is used to cause the terminal device to add the first secondary node or to be handed over from a second secondary node to the first secondary node,
   the first key is used for signaling transmission performed between the terminal device and a master node by using a first SRB, and
   the first secondary node and the master node share one central unit.

6. The communication method according to claim 5, wherein the first SRB is SRB1 or SRB2, and the second SRB is SRB3.

7. The communication method according to claim 5, wherein
   the RRC reconfiguration message comprises a first value, and
   in response to the first value being a preset value, the first value is used to indicate that the first key is used for signaling transmission performed between the terminal device and the first secondary node by using the second SRB.

8. The communication method according to claim 7, wherein the first value is an sk-counter value.

9. A communication apparatus, comprising:
   a processor; and
   a memory having instructions stored thereon that, when executed by the processor, cause the communication apparatus to:
   process indication information received from a master node, wherein
   the indication information is used to indicate that a key used for signaling transmission performed between a terminal device and a first secondary node by using a second signaling radio bearer (SRB) is a first key,
   the indication information is carried in a radio resource control (RRC) reconfiguration message,
   the RRC reconfiguration message is used to cause the terminal device to add the first secondary node or to be handed over from a second secondary node to the first secondary node,
   the first key is used for signaling transmission performed between the terminal device and the master node by using a first SRB, and
   the first secondary node and the master node share one central unit; and
   determine, based on the indication information, that the first key used for signaling transmission performed between the terminal device and the first secondary node by using the second SRB.

10. The communication apparatus according to claim 9, wherein the first SRB is SRB1 or SRB2, and the second SRB is SRB3.

11. The communication apparatus according to claim 9, wherein
   the RRC reconfiguration message comprises a first value, and
   the communication apparatus is further caused to:
   in response to the first value being a preset value, determine, based on the first value, that the first key is used for signaling transmission performed between the terminal device and the first secondary node by using the second SRB.

12. The communication apparatus according to claim 11, wherein the first value is an sk-counter value.

13. A communication apparatus, comprising:
a processor; and
a memory having instructions stored thereon that, when executed by the processor, cause the communication apparatus to:
  send indication information to a terminal device, wherein
    the indication information is used to indicate that a key used for signaling transmission performed between a terminal device and a first secondary node by using a second signaling radio bearer (SRB) is a first key,
    the indication information is carried in a radio resource control (RRC) reconfiguration message,
    the RRC reconfiguration message is used to cause the terminal device to add the first secondary node or to be handed over from a second secondary node to the first secondary node,
    the first key is used for signaling transmission performed between the terminal device and a master node by using a first SRB, and
    the first secondary node and the master node share one central unit.

14. The communication apparatus according to claim 13, wherein the first SRB is SRB1 or SRB2, and the second SRB is SRB3.

15. The communication apparatus according to claim 13, wherein
  the RRC reconfiguration message comprises a first value, and
  in response to the first value being a preset value, the first value is used to indicate that the first key is used for signaling transmission performed between the terminal device and the first secondary node by using the second SRB.

16. The communication apparatus according to claim 15, wherein the first value is an sk-counter value.

17. The communication method according to claim 1, wherein the RRC reconfiguration message is used to cause the terminal device to add the first secondary node.

18. The communication method according to claim 1, wherein the RRC reconfiguration message is used to cause the terminal device to be handed over from a second secondary node to the first secondary node.

19. The communication method according to claim 5, wherein the RRC reconfiguration message is used to cause the terminal device to add the first secondary node.

20. The communication method according to claim 5, wherein the RRC reconfiguration message is used to cause the terminal device to be handed over from a second secondary node to the first secondary node.

* * * * *